(12) United States Patent
Doney et al.

(10) Patent No.: US 11,038,718 B2
(45) Date of Patent: Jun. 15, 2021

(54) METHOD, APPARATUS, AND COMPUTER-READABLE MEDIUM FOR TRANSACTION MANAGEMENT SPANNING MULTIPLE HETEROGENEOUS COMPUTING NETWORKS

(71) Applicant: SECURRENCY, INC., Annapolis, VA (US)

(72) Inventors: George Daniel Doney, Riva, MD (US); Illya Shkapo, Kharkov (UA)

(73) Assignee: SECURRENCY, INC., Annapolis, MD (US)

( * ) Notice: Subject to any disclaimer, the term of this patent is extended or adjusted under 35 U.S.C. 154(b) by 3 days.

(21) Appl. No.: 16/861,315

(22) Filed: Apr. 29, 2020

(65) Prior Publication Data
US 2020/0267020 A1   Aug. 20, 2020

Related U.S. Application Data

(63) Continuation-in-part of application No. 15/416,202, filed on Jan. 26, 2017.

(60) Provisional application No. 62/839,971, filed on Apr. 29, 2019, provisional application No. 62/388,333, filed on Jan. 27, 2016.

(51) Int. Cl.
| | | |
|---|---|---|
| *H04L 12/46* | (2006.01) | |
| *G06Q 20/36* | (2012.01) | |
| *H04L 12/721* | (2013.01) | |
| *G06F 16/901* | (2019.01) | |
| *G06F 16/23* | (2019.01) | |
| *G06Q 30/02* | (2012.01) | |

(52) U.S. Cl.
CPC ...... *H04L 12/4633* (2013.01); *G06F 16/2379* (2019.01); *G06F 16/9024* (2019.01); *G06Q 20/36* (2013.01); *G06Q 30/0283* (2013.01); *H04L 45/14* (2013.01)

(58) Field of Classification Search
None
See application file for complete search history.

(56) References Cited

U.S. PATENT DOCUMENTS 5,757,368 A    5/1998  Gerpheide et al.
6,970,837 B1  11/2005  Walker et al.
(Continued)

OTHER PUBLICATIONS

"Computer Architecture", techopedia.com, Jun. 20, 2017 (Year: 2017).*

(Continued)

*Primary Examiner* — Scott C Anderson
(74) *Attorney, Agent, or Firm* — Rimon PC; Marc Kaufman

(57) ABSTRACT

A method and apparatus for providing communications between dissimilar computing networks, such as distributed ledger networks. A ledger-agnostic overlay network and computing architecture spans a range of digital communication networks including transaction only DLT networks like Bitcoin's DLT, smart contract based DLT like Ethereum, and also traditional centralized systems. Implementations communicate transaction information across heterogeneous jurisdictional boundaries, payment networks, banking systems, public and private distributed ledgers, internal corporate accounting systems, and exchanges.

16 Claims, 13 Drawing Sheets

(56) References Cited

U.S. PATENT DOCUMENTS

| | | |
|---|---|---|
| 2003/0158811 A1 | 8/2003 | Sanders et al. |
| 2008/0275748 A1 | 11/2008 | John |
| 2013/0232075 A1 | 9/2013 | Monaghan et al. |
| 2015/0286997 A1* | 10/2015 | Zimmerman .......... G06Q 20/36 |
| | | 705/39 |
| 2015/0332262 A1 | 11/2015 | Lingappa |
| 2015/0347989 A1 | 12/2015 | Kumar et al. |
| 2016/0162897 A1 | 6/2016 | Feeney |
| 2016/0210626 A1 | 7/2016 | Ortiz et al. |
| 2017/0054716 A1 | 2/2017 | Egorov et al. |
| 2017/0177334 A1* | 6/2017 | Chou .................. G06F 3/04842 |
| 2017/0213289 A1 | 7/2017 | Doney |
| 2018/0205552 A1* | 7/2018 | Struttmann .......... G06F 16/9024 |
| 2018/0343114 A1* | 11/2018 | Ben-Ari .................. G06F 21/64 |
| 2019/0013943 A1 | 1/2019 | Maim |
| 2019/0104413 A1* | 4/2019 | Cidon ................. H04L 63/0272 |
| 2020/0013118 A1* | 1/2020 | Treat .................... G06Q 20/383 |

OTHER PUBLICATIONS

International Searching Authority, International Search Report and Written Opinion for International Application No. PCT/US20/30350 dated Jul. 27, 2020.

\* cited by examiner

METHOD, APPARATUS, AND COMPUTER-READABLE MEDIUM FOR TRANSACTION MANAGEMENT SPANNING MULTIPLE HETEROGENEOUS COMPUTING NETWORKS

RELATED APPLICATION DATA

This application claims priority to U.S. Provisional Application No. 62/839,971 filed on Apr. 29, 2019, and is a continuation-in-part of U.S. application Ser. No. 15/416,202, filed on Jan. 26, 2017, which claims priority to U.S. Provisional Application No. 62/388,333, filed Jan. 27, 2016, the entire disclosures of which are incorporated herein by reference.

FIELD OF THE INVENTION

The invention relates to transaction management for value transfers spanning multiple heterogenous computing networks.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Most financial transactions involve transfers of value that require coordination between multiple proprietary system ledgers, such as the ledgers of two different financial institutions. Financial institutions worldwide can send and receive information about financial transactions across the SWIFT (Society for Worldwide Interbank Financial Telecommunication) network in standardized messaging formats, such as MT103 or ISO 20022. SWIFT messaging allows payment orders to be transmitted between financial institutions. SWIFT does not facilitate funds transfer. The payment orders must be settled by correspondent accounts that the institutions have with each other in the conventional banking system. Each financial institution must either be a bank or affiliate itself with a bank. Settlement is a complex process of comparing ledgers between the dissimilar systems of each bank involved in the transaction. This process is reliable but is relatively slow and inefficient.

Even simple transactions like payments and exchanges often involve more than one proprietary system. More complex transactions (purchases, loans, etc.) almost always involve more than one ledger. Examples of common transactions that involve multiple ledgers and/or accounting balances include:

Custody (Deposits/Withdrawals) in which value is transferred to an agent or network for safekeeping and/or convenience;

Remittances (Cross border payments) which transfer value between payment networks;

Cross provider transactions (e.g. PayPal to AliPay) in which banks and payment providers store depositors' value on internal ledgers;

Cross distributed ledger transactions (e.g. Bitcoin to Ethereum) in which units of value are transferred or traded by owners of wallets on different DLT providers;

Enterprise finance (internal bookkeeping↔external finance) in which governments and multinational corporations often have fragmented accounting systems, transact multiple currencies, and have complex governance structures;

Cross Exchange Operations in which traders will often have multiple accounts on different exchanges to obtain maximum liquidity. Transfers between exchange accounts can be costly or time consuming and involve cross ledger transactions;

Asset Transformation in which an asset is transformed from one type to another and which can involve bundling/unbundling of rights (such as separating voting rights from beneficial ownership.

Distributed Ledger Technology (DLT), such as blockchain, has been implemented to transfer value via decentralized networks, with fungible and non-fungible assets represented by and encapsulated in digital tokens. DLT network providers, that is parties who develop and maintain distributed ledger protocols, continue to proliferate and innovate resulting in a wide range of DLT offerings, each with its own strengths and weaknesses. For each DLT offering, transactions are recorded to the ledger based on confirmation accomplished through a consensus mechanism. DLT has the potential to disintermediate legacy banking systems and allow any party to transfer value directly to another party. While DLT has an objective of removing intermediating parties, a constraint on the utility of DLT networks is that the digital tokens, generally, are native and locked to the underlying DLT on which they are created. Each DLT network can be designed to achieve specific objectives and thus can have its own tokens, protocols, consensus mechanisms, and ontologies. Therefore, transactions between DLT systems, i.e., "cross-ledger" transactions, require mediation in a manner that is not substantively different than the coordination required between legacy data systems. Without mitigation, this constraint limits the upside to DLT as it confines participants to "walled gardens" that limit scalability and extensibility.

Further, most commercial and financial services are built on traditional centralized ledger (relational or NOSQL database) technologies. These legacy transfer providers are responsible for the vast majority of transactions today. To conduct meaningful commerce for the foreseeable future without forcing participants to choose transaction methods that are exclusively "on chain" (DLT only) or solely traditional, transaction systems must efficiently span both traditional centralized and distributed ledger systems. A framework to provide seamless transfer of value within and across centralized and distributed ledger providers provides significant utility to the growing set of blockchain offerings.

In 2014, Ripple and Stellar, two leading distributed ledger companies, introduced methods for cross border delivery of value that mirrored known "Nostro Vostro" techniques. These techniques provide an efficient model to move value but the methods do not support an integration framework independent from the respective Ripple and/or Stellar networks. Therefore, all transactions, even between legacy or third-party providers are dependent on traversing these networks. Additionally, the methods do not include integrated models for pricing transactions from third party centralized or decentralized exchanges, a significant limitation when liquidity is limited on their network.

In 2019, Accenture and JP Morgan published a paper entitled "Enabling Cross-Border High Value Transfer Using Distributed Ledger Technologies" detailing the results of an approach to facilitating cross ledger value transfers. The centerpiece of this approach is the use of Hash Time Locked Contracts (HTLC) to bridge between ledgers. While this approach breaks the dependency on any single ledger, it has several limitations. First, the use of HTLC requires direct communication and coordination between the sender and recipient (the exchange of a hashed key). Second, the HTLC mechanism requires ledgers that support smart contracts and thus cannot be used with DLTs that do not support smart contracts, such as Bitcoin, Ripple, Stellar, or legacy centralized systems. These limitations make the method unsuitable to facilitate many types of value transfer methods.

In addition to failing to efficiently support transactions that cross multiple ledgers or other communications networks, known systems fail to efficiently support transactions that: convert currencies, tokens, or assets; include multiple jurisdictions or policies; require a change in object form (decompose/recompose an asset); cross multiple banking networks, payment providers or transfer service providers.

SUMMARY

The disclosed support implementations overcome all of the limitations noted above with respect to cross-network transfers. For simplicity, the terms "transfer" or "network transfer" as used herein include any type of transactions or transformation. While distributed ledger technologies (DLT) simplify the transmission of value within a network, most transactions involve more than one ledger—demanding a scalable, repeatable framework to record transactions that affect more than one ledger. Disclosed implementations orchestrate cross-ledger transactions, streamline the hypothecation and transmission of value, track assets and obligations across heterogenous systems, simplify regulatory oversight, and maintain necessary liquidity across the underlying ecosystems.

The disclosed implementations include a ledger-agnostic overlay network designed to span the range of digital transfer networks including transaction only DLT networks like Bitcoin's DLT, smart contract based DLT like Ethereum, and also traditional centralized computing systems so that value transfers can be made within and across them, traversing heterogeneous jurisdictional boundaries, payment networks, banking systems, public and private distributed ledgers, internal corporate accounting systems, exchanges, and more.

Disclosed implementations include a Finance Ontology, that is a syntax-independent model of financial transactions including value transfers, a catalog of transfer messaging terms and associated items, and a translation schema to convert heterogeneous implementations to the applicant's syntax-independent model.

Disclosed implementations also include a Transaction Service Bus module that decouples the detail of individual value transfer systems (e.g., DLTs, payment networks, banking systems) by providing global interfaces for the movement of value (and other financial transactions).

When a cross-network transaction is proposed, the Transaction Service Bus module inspects proposed transactions and engages a Route Planning Service to discover potential value transfer paths from source to ultimate recipient using a series of chained sub-transactions between and across transfer providers. The sender (or sender's representative which may be an artificial intelligence engine) may then choose the preferred route based on preferences for speed, cost, or reliability.

The sender then authorizes the preferred choice and engages the Chained Transfer Handler module to engage any wrapped transfer system and thereby manage the transmission of value through dissimilar networks. Alternatively, the transaction can be initiated by an external source sending value to the inbound source wallet with delivery instructions. A Route Planning Service module is executed to determine an optimized transfer path including a chain of multiple sub-transactions and a Chained Transfer Handler executes the transactions in a controlled manner.

One aspect of the invention is a method for interfacing heterogenous computing networks and transfer providers to accomplish a transformation transaction. The phrase "transformation transaction", as used herein, refers to a transaction that includes value to travel cross-ledger or cross-network, requires currency/asset transformation, includes multiple jurisdictions, or requires object decomposing and/or recomposing. The method comprises: receiving information for a cross network transfer, that is a transaction that must span at least two networks, providers, ledgers, asset classes or forms, or value types; traversing a graph structure to find viability paths between source and destination, the graph structure being formed by a multi-agent system that crawls the networks and adjoining bridges to create and maintain a network topology, stored as a graph structure of nodes, wherein, each node in the graph structure has an associated set of attribute variables, the attribute variables specifying bridging characteristics and logical network interfaces to at least one node in another network; generating transaction routing information for effecting the transaction based on the graph structure; determining transfer paths based on the transaction routing information, the transfer paths including a set of sub-transactions that ensures proper execution of the cross ledger transaction, the determining including inspecting a catalog of transfer messaging terms and a translation schema to convert heterogeneous network provider implementations into the optimized transfer path via a syntax-independent model and modeling the sub-transactions according to the syntax-independent model; initiating the complex transfer via a delivery model that spans networks; recording the complex transfer via an independent ledger using zero knowledge proofs for immutability and privacy; and, executing the sub transactions by applying the logical interfaces to transfer value within and between the at least two networks and thereby achieve the cross network transaction.

Pairs of nodes in the graph structure and the corresponding sets of attribute variables can define a bridge data structure providing a procedural linkage between the nodes in the pairs of nodes, wherein at least some of the pairs of nodes correspond to accounts in different networks.

The bridge data structure can specify at least one source wallet, at least one destination wallet, supported units of value, and a transaction pricing model for transaction communication flowing between nodes in the pair of nodes. The bridge data structure can specify transformation logic to be attached to the logical interfaces.

The generation of transaction routing information can include traversing the graph structure in accordance with a node traversing algorithm and parsing the attribute variables. Transfer details for the overarching chain transfer with linkages to each sub-transaction can be published on a distributed ledger that can be separate from the transfer networks that are traversed.

DETAILED DESCRIPTION

Figure 1:
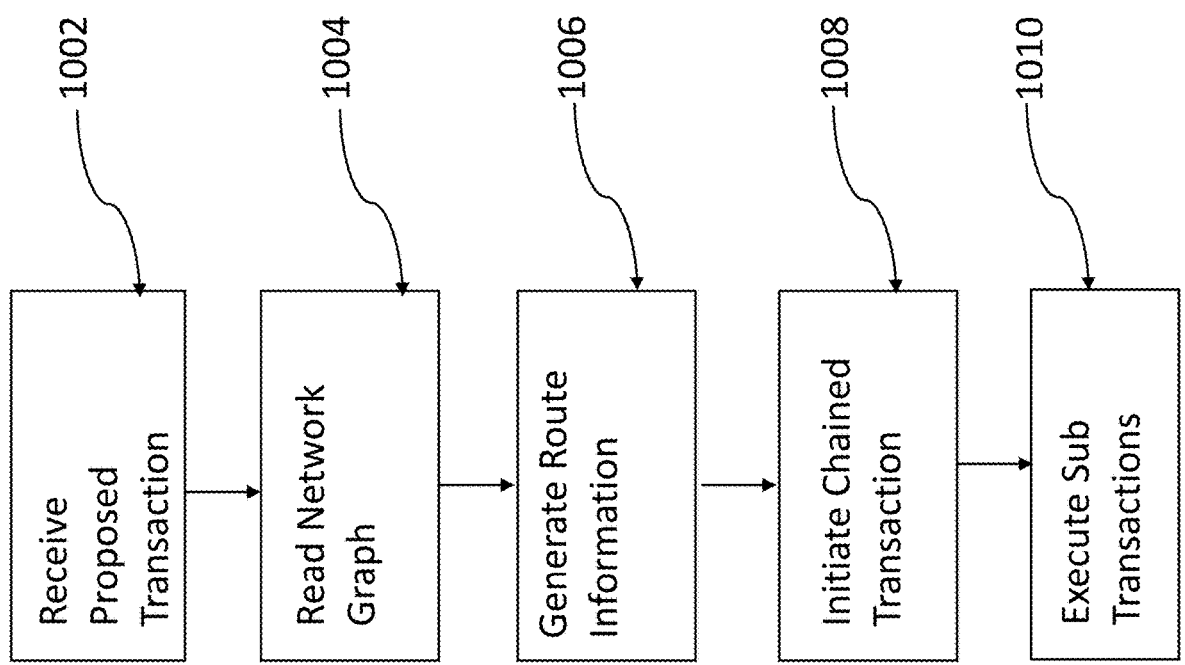
FIG. 1 is a flow chart of a method for providing communications between dissimilar networks in accordance with disclosed implementations.

FIG. 1 illustrates a method of interfacing heterogenous DLT systems for conducting a transformation transaction in accordance with a disclosed implementation. At 1002, information is received describing a desired/requested cross ledger transaction that spans at least two dissimilar networks, such as two different DLT networks. At 1004 a multi-network graph structure is read. The graph structure can be created by crawling nodes corresponding to bridges that span networks. Each node in the graph structure can have an associated set of attribute variables as node metadata. The attribute variables can include units of value (tokens) native to the corresponding network, identification of smart contracts implementing the tokens, wallets or accounts used for bridging, value sources available to the user, and API's and network interfaces to other networks. At 1006 transaction routing information is generated for effecting the transaction by traversing the graph structure in accordance with a node traversing algorithm and detecting bridge nodes that facilitate the desired transaction. At 1008, a transfer path is selected by the source based on preferences using the transaction routing information and the transfer is initiated. The desired transfer path can include a chained set of sub-transactions that ensures proper execution of the requested cross ledger transaction. At 1010 sub-transactions are executed using the specified interfaces to achieve the cross network transaction. Sub-transactions are executed on heterogeneous networks using an ontology mapping that converts syntax-independent execution instructions to specific instructions recognized by the underlying transfer network. The overarching transaction and all sub-transactions can be recorded on a ledger, that may be distinct from the ledgers involved in sub-transactions. The independent ledger may utilize zero knowledge proofs to provide immutability while maintaining transaction privacy. Note that the chains of sub-transactions can include transactions in the source network, the destination network and other networks that serve to as connections between the source network and destination network.

Figure 2:
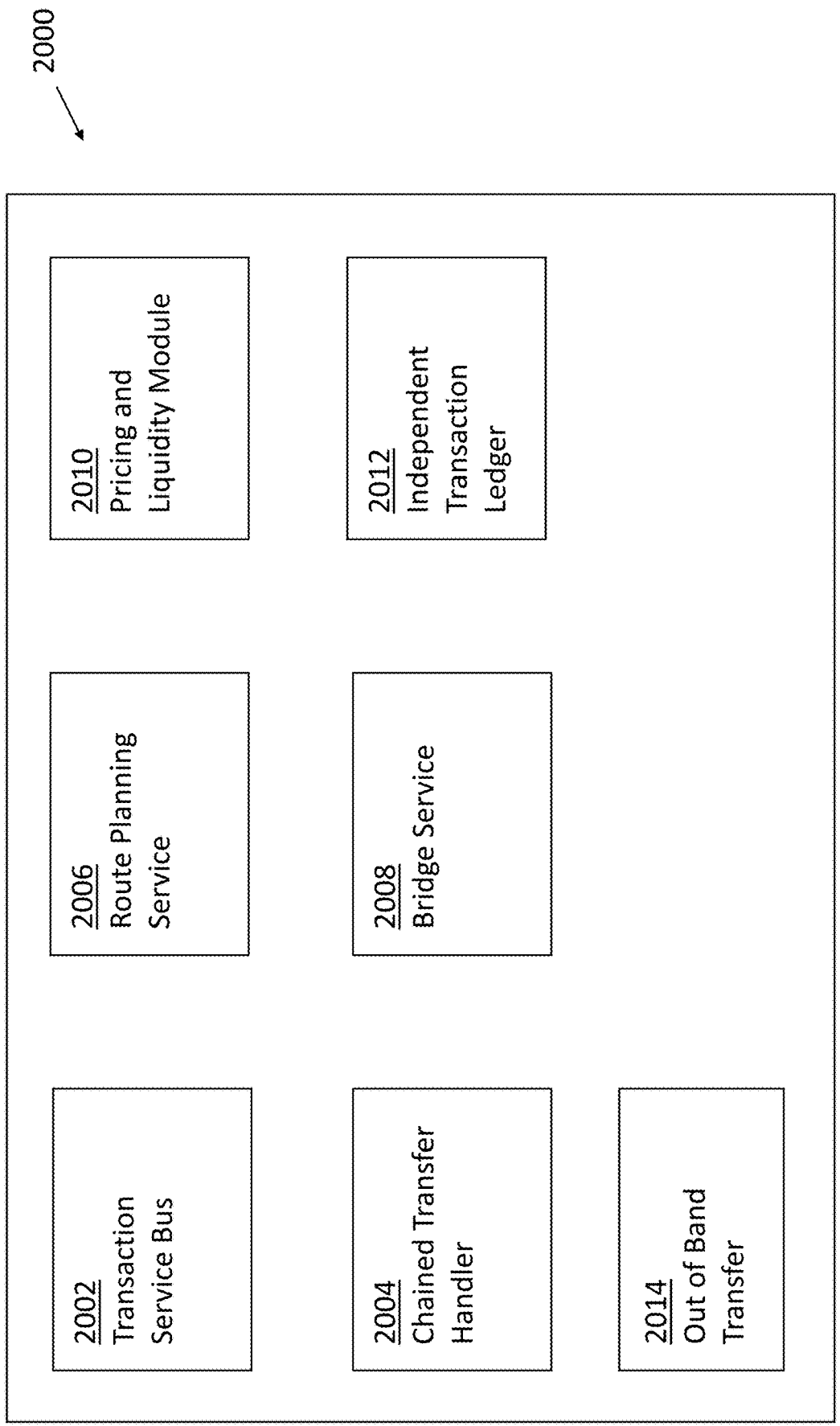
FIG. 2 is a schematic diagram of a computer architecture for providing communications between dissimilar networks in accordance with disclosed implementations.

FIG. 2 schematically illustrates a computer architecture in accordance with a disclosed implementation for accomplishing the method of FIG. 1 and other transformation transfers. The architecture 2000 consists of Transaction Service Bus module 2002, Chained Transfer Handler module 2004, Planning Service module 2006, Bridge Service module 2008, Pricing and Liquidity module 2010, Independent Transaction Ledger module 2012, and Out-Of-Band Transfer/Replenishment module 2014. Each module of architecture 2000 can communicate with the others as necessary through a networked computing environment.

The modules described herein can be implemented as computer executable code within a single computer processing unit or multiple computer processing units. One or more of the modules may be implemented remotely from the other modules in a distributed architecture. The description below of the functionality provided by the different modules is for illustrative purposes, and is not intended to be limiting, as any of modules may provide more or less functionality than is described. For example, one or more of modules may be eliminated, and some or all of its functionality may be provided by other ones of modules.

As described above, automated execution of transformation transaction, such as an inter-network (cross-ledger) transaction, is accomplished in response to receiving a transaction data structure specifying the details of a proposed cross ledger transaction, such as a value transfer. The data structure can include transaction details (e.g., source, destination, amount, currency) and can be created by a party with the authority to initiate the transfer. For example, the transaction data structure could be (TransactionType=Transfer, TransactionCurrency=Ether, Source=[wallet 1 address], Destination=[wallet 2 address]).

Transaction Service Bus module 2002 parses the transaction data structure and determines, based on the graph, one or more viable paths (including expected pricing, fees, and transaction times) for traversing multiple networks to execute the specified transaction. The path determination is made based upon a model of the networks determined by Route Planning Service module 2006 (in the manner described in detail below) and includes a transaction chain consisting of multiple sub-transactions, each sub transaction having a source and a destination. If asset transformation is required on a path, Pricing and Liquidity module 2010 specifies the ratio between the source and destination assets required for a bridge traversal based on bridge metadata (described below). Chained Transfer Handler module 2004 executes the sub-transactions (with Zero Knowledge Proofs, as desired to protect privacy) as a sequence of network transfers, confirmations, and bridge traversals (as specified by Bridge Service module 2008 described below) to ultimately affect the value transfer of the specified transformation transaction. Out of Band Transfer module 2014 can be used to include non-network (manual or un-instrumented) transfers. Out of Band Transfer 2014 module is used to rebalance account resources, as needed, based on the consumption of liquidity in the sub-transactions. Transaction records can be recorded by Independent Transaction Ledger module 2012. Disclosed implementations can leverage the compliance framework described US Published Patent Application No. US20190164151 A1 to safeguard cross ledger transactions and conduct compliance verification on dissimilar networks.

The model of the networks noted above is created by Route Planning Service module 2006 utilizing a multi-agent system that crawls various networks (which may be expected to participate in a cross ledger transaction) and bridge node to identify a viable path for the transfer of value between the source and destination. The inter-network topology can be stored as a graph structure of nodes. The node attribute variables are described in greater detail below and can include descriptions of value units (tokens) native to the particular network, traversal methods, accounts used for bridging, fees and pricing methods, and associated API's and network interfaces for the purposes of communication with external sources.

Figure 3A:
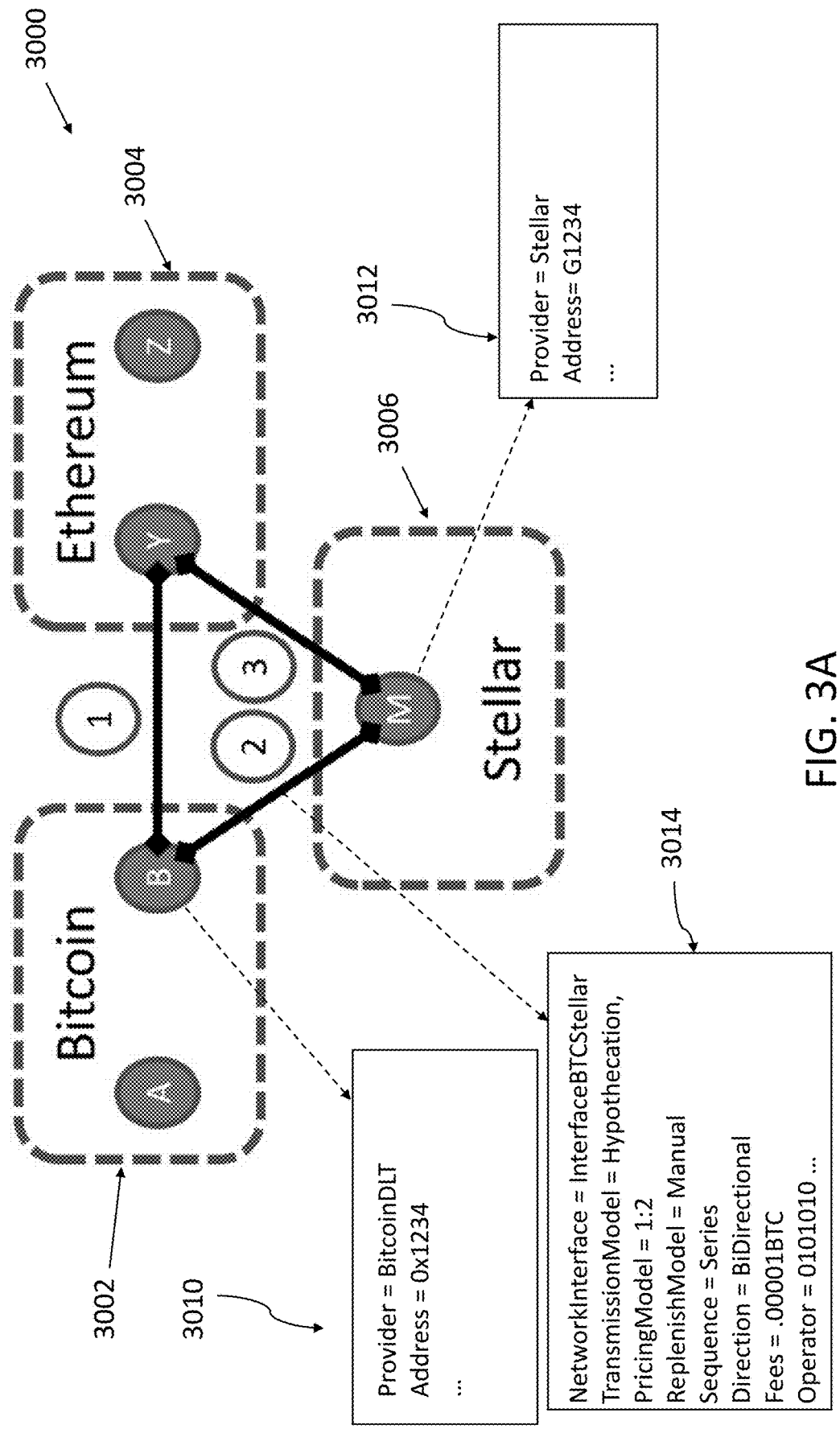
FIG. 3A is a schematic illustration of a node graph in accordance with disclosed implementations.

FIG. 3A is a schematic diagram of an abstraction of a simple graph structure 3000, traversed by the Route Planning Service module 2006, of an inter-network topology in accordance with an implementation. For example, Network 3002 can be the Bitcoin blockchain, network 3004 can be an Ethereum protocol blockchain, and network 3006 can be a Stellar protocol blockchain. In FIG. 3A, three dissimilar networks (3002, 3004, and 3006) are illustrated however, any number of or any type of dissimilar networks can be included in implementations. In FIG. 3A, each network has an illustrated bridge node, each node representing one side of a Bridge that provides communication between networks. Node B is a bridge node in DLT network 3002, node M is a bridge node in DLT network 3006, and Node Y is a bridge node in DLT network 3004. Each bridge node corresponds to an account/wallet in the corresponding DLT network. A pair of bridge nodes Bridge. For example, nodes B and M define a Bridge between DLT network 3002 and DLT network 3006. Each bridge node has a corresponding metadata record indicating the above-noted set of attribute variables. Further, bridge characteristic data is stored as bridge metadata. Each pair of bridge nodes connected with a line in FIG. 3A, and the associated metadata (node metadata and bridge characteristic metadata) defines a Bridge. Of course, there can be any number of nodes and bridge nodes in the graph (typically thousands) and FIG. 3 is a simple graph for illustrative purposes.

Figure 3B:
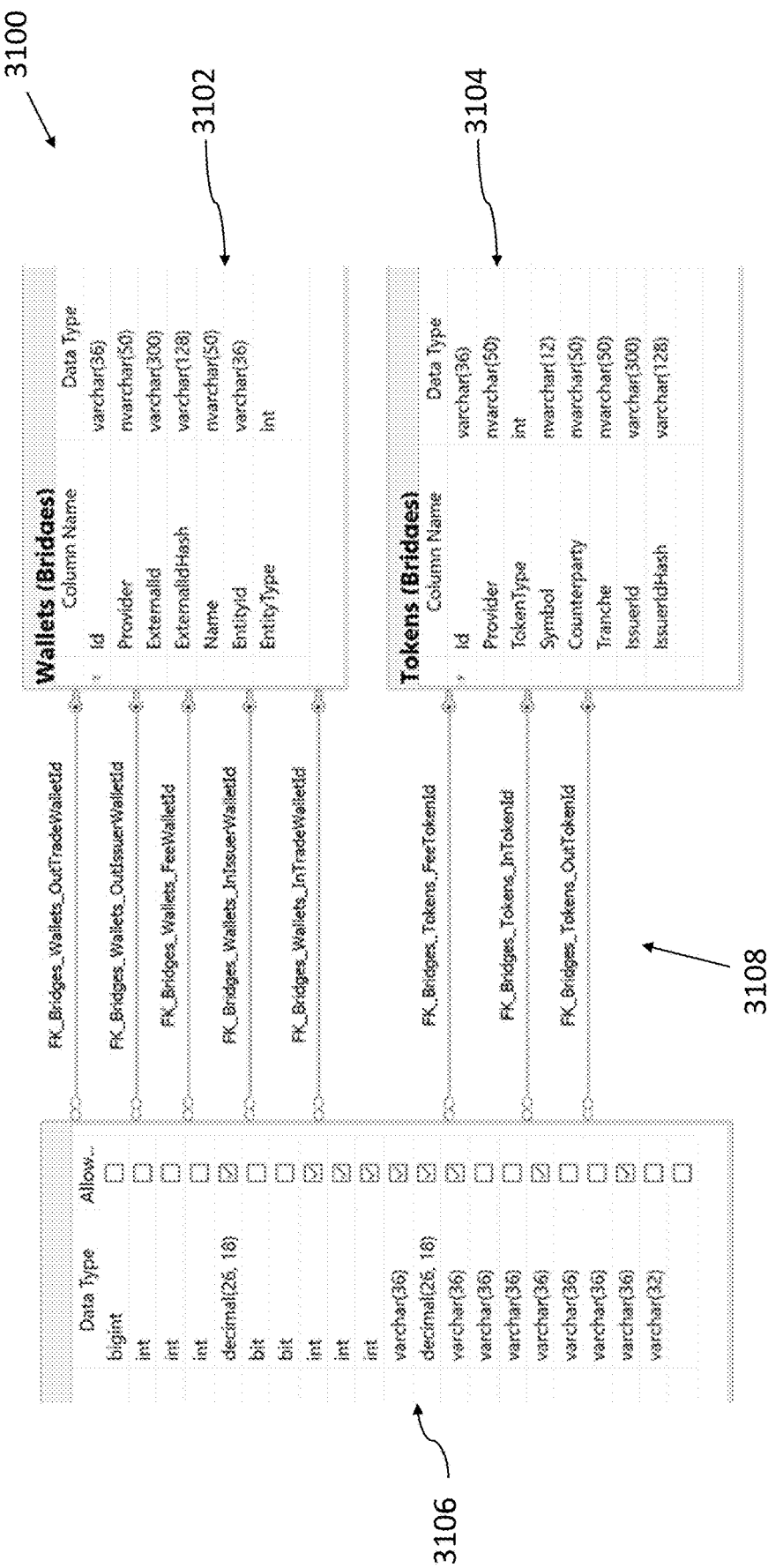
FIG. 3B is a schematic illustration of a bridge metadata schema.

As an example, metadata record 3010 is stored in association with node B, metadata record 3012 is stored in association with node M and bridge characteristic metadata record 3014 is stored to define the connection between node B and node M. Therefore, a Bridge is defined by metadata records 3010, 3012, and 3014 (collectively bridge metadata") of graph structure 3000. A more detailed schema 3100 of the bridge metadata, in accordance with an implementation, is shown in FIG. 3B. Schema 3100 includes wallet attributes 3102 (which can be stored in the graph as node metadata), token attributes 3104 (which can be stored in the graph as node metadata), data type attributes 3106 (which can be stored in the graph as bridge characteristic metadata), and interfaces 3108 (which include pricing models and other logic and which can be stored in the graph as bridge characteristic metadata). While metadata records 3010, 3012, and 3014 of FIG. 3A are illustrated as three distinct records, the data therein can be combined into a single record of bridge metadata or divided over additional records based on the architecture of graph 3000. Disclosed implementations use a standard schema for specifying the metadata. Bridges serve as connection paths between dissimilar networks. The graph allows transaction paths to locate and use Bridges in cross-ledger transaction chains (or in certain cases in intra-ledger transactions as discussed below. The metadata records 3010, 3012, and 3014 is discussed in greater detail below in connection with Bridge functions.

The data in graph 3000 is stored by the Bridge Service module 2008 and traversed by the Route Planning Service module 2006 Transaction Service Bus module 2002 provides optimized transaction routing information, including sub transactions required to effect the transformation transaction. When presented the routes, the source account can initiate a chained transaction, based on the graph and user preferences such as one or more of transaction time, conversion rates and fee load. Chained Transfer Handler module 2004 manages transaction execution including the proposed sub transactions to ensure proper transfer execution (or rollback) through ultimate delivery. Route planning and path optimization are described in greater detail below.

Transaction Service Bus module 2002 implements a finance ontology, that serves as a syntax-independent model of value transfers, a catalog of transfer messaging terms and associated items, and a translation schema to convert heterogeneous implementations of the various networks to the syntax-independent model. Chained Transfer Handler module 2004, executes sub-transactions on heterogeneous networks via the Transaction Service Bus module 2002 which translates the proposed sub-transactions from the syntax-independent instructions to the network specific implementation.

The finance ontology is an abstraction layer that provides a common language for financial transactions. The ontology defines interfaces for the services, functions, and objects encountered in financial systems. The ontology provides an interoperability layer isolating the differences between the implementations of individual service providers providing for a flexible modular system where individual components are loosely coupled. The ontology makes it possible to compose individual financial services into complex financial systems even if individual services are not designed to work together. Since payment chaining is designed to connect any transfer network to any other transfer network, the common service definition reduces the complexity of the interconnecting N systems from N factorial (N!) to N. Thus, the ontology is designed to make large integrations tractable. Standard functions and interfaces of the technology are discussed below.

However, developing a common abstraction for each underlying provider for the sake of tractability may reduce the expressivity (that is, special features that can be exposed by unique providers) of individual providers. The disclosed framework has two mechanisms to ensure that expressivity is not lost for tractability. First, "wrappers" may expose features that are unique to a specific provider/network or to a subclass of providers/networks. In this case, dependent clients may interface directly with the an implementation specific wrapper to leverage these unique features. However, this creates a direct dependency between the client and service implementation that tightly couples the client to the service implementation limiting modularity and scalability. The implementer may decide if the tradeoff to gain unique functionality is worth the increased dependency on a specific provider/network. Additionally, the ontology includes a data structure that enables additional data with a locally defined specification to be carried in a general purpose interface. The core data structures include an OtherData field that has a specification that includes type and data information enabling parsers to inspect the data and parse it if the format is recognized. This structure enables point to point communications between systems that may require additional data to be carried in structures used by all parts of the system. As a result, coordinating functions, like those exhibited in the Chained Transfer Handler, can perform functions at global scope without sacrificing the unique features of specific transfer providers.

As noted above, Bridge Server module 2008 provides logical interfaces, Bridges, between the various DLT networks and relays transactions and value between them. Bridges can accommodate token types representing dissimilar assets and units of value. Bridge server module 2008 implements the Bridges to create a logical cross-ledger connection based on the model and node metadata. Essentially a Bridge is a data structure that defines the transfer behavior. Bridge Server module 2008 reads the metadata records 3010, 3012, and 3014 (FIG. 3) and determines bridge type, assigns Vostro wallet(s), assigns Nostro wallets, identifies fees, determines pricing models, assigns out-of-band replenish as necessary, and identifies and attaches transformation logic in the manner set forth below. A bridge operator, that is an entity or system process with appropriate permissions to operate via both networks spanned by a bridge can be indicated in the metadata record 3014. Bridging accounts are created or assigned to link the source and destination networks. The source account in a Bridge is often a custody account and should be active for two way bridge support and the destination should be active and may require a linked issuer for certain types of transfers.

Various classes of Bridges can be created and stored by Bridge Service module 2008, with a range of options in price discovery (pegs, floats, exchanges), accounting (translation, indenture), and transfer (in band, out of band). These classes provide common interconnectivity patterns facilitating repeatable processes to execute and record the movement of value between networks. A contained bridge class is composed of options in areas such as price discovery, accounting, and transfer (e.g., in-band and out-of-band combinations), as specified by the metadata model. Dissimilar networks are connected together using Bridges and thus Bridges facilitate the flow of value between networks and can extracting a toll for the service, as specified by the metadata. Bridges create connections between networks or units of value that receive and relay value transfers across different transmission networks by controlling:

Transmission mode: hypothecation (by reference), settlement (by value), linkage, or trade—transformation (changing, splitting the assets)

Pricing: exchange, algorithmic, pegging

Synchronicity: Synchronous or asynchronous (with hedging & risk management)

Fee, capital supply logistics, and liquidity management

Each Bridge includes an inbound account and an outbound account (associated with, for example, nodes B and M respectively in FIG. 3. The accounts can be owned by the bridge operator with "system" permissions to be operated as part of a transaction chain. These accounts are provided as configuration parameters in the bridge metadata during the creation of the Bridge. The value units supported by the inbound and outbound accounts defines the connections supported by the Bridge. Supported connections are necessary for transfer routing. Using the example of FIG. 3 where a transaction originates in the Bitcoin Ledger (DLT network 3002) and crosses into the Stellar Network (DLT Network 3006), the inbound (Vostro) Account of the Bridge (for example B in FIG. 3) becomes the destination account for the initial sub payment in the transaction chain. This account does not need to be an "Active" account, that is containing authority to operate unless "rollback" capability is required. The outbound (Nostro) account of the Bridge (for example M in FIG. 3) is used to send value down the chain or to the final destination. The Nostro account should be Active, meaning the processing thread should have the authority to initiate a transaction from the account. For Dark Pool transactions, that is a transaction with prepositioned value, sufficient value must be present in the inbound bridge account prior to initiating the chained transaction. Bridges can be loaded from Bridge Server module 2008 into a list used by Chained Transfer Handler module for route planning and payment execution. The class used to execute the Bridge is determined by the configuration.

The list of possible routes from one wallet type to another wallet given the desired destination value unit can be determined by evaluating the supported tokens, indicated in bridge metadata, for inbound and outbound wallets used by the available Bridges. Route Planning Service module 2006 uses this list when mapping paths from source to destination. For example, graph 3000 of FIG. 3 shows two possible routes between DLT network 3002 and DLT network 3006. The first route is indicated by 2 and the second route is indicated by the combination of 1 and 3.

In addition to Bridge configuration details, operational attributes of Bridge classes are determined by dependency injected details and can be stored as bridge metadata. Variations in Bridge operations in disclosed implementations can be divided into 6 attributes defined in the metadata: Transmission Model, Pricing Model, Replenish Model, Sequence, Direction, and Fees. The Transmission Model defines how ledgers are linked together via bridging wallets. Five types of Transmission Models can be implemented: Hypothecation (Deposit), Settlement (Withdrawal), and Transfer (NostroVostro), Transmute (ledger change), and Transform. The model to be used can be determined based on the desired transfer mode, bridge operator's ability to perform issue/burn operations, the availability of custody wallets, and other business requirements.

The Pricing Model defines the ratio of the number of destination ledger tokens sent for every source token received by the bridge. Pricing Model implementations include: a Link (1:1), a Peg (fixed ratio), Algorithmic (dependency injected plugin), or External (taken from a third party source such as an exchange). The Replenish Model defines the mechanism used to refill the outbound wallet when excessive unbalanced flow takes place and resources must be repositioned. Replenish Model implementations include: None, Manual, Transfer, and Exchange. Bridges have a Sequence (Series/Parallel) and Direction (Unidirectional/Bidirectional) indicating how they can be executed.

In cases of multi-ledger issuances, Bridges may implement cross-ledger transmutation. This may be used when the official record of ownership is on a separate ledger than the one being used for transfer, or the official record is the sum of ownership records on affected ledgers. Transmutation permits tokens to be issued on multiple ledgers and/or provides a means by which tokens issued on one ledger can "flow" to another. As tokens move from ledger to ledger, the total number of tokens in circulation remains constant while the ownership record moves from ledger to ledger.

For example, funds exiting a ledger are sent to a Source Ledger Base Wallet. This transfer may also be an escrow transaction placing a hold on the tokens without moving them. An equivalent number of tokens are issued into circulation on the Destination Ledger from the Issuer (wallet, account, or smart contract) or Cold Wallet to the Outbound Wallet on Provider B for delivery to the destination.

On successful delivery, the IIssuer.Destroy function called on the source ledger removing the tokens from circulation.

Figure 4:
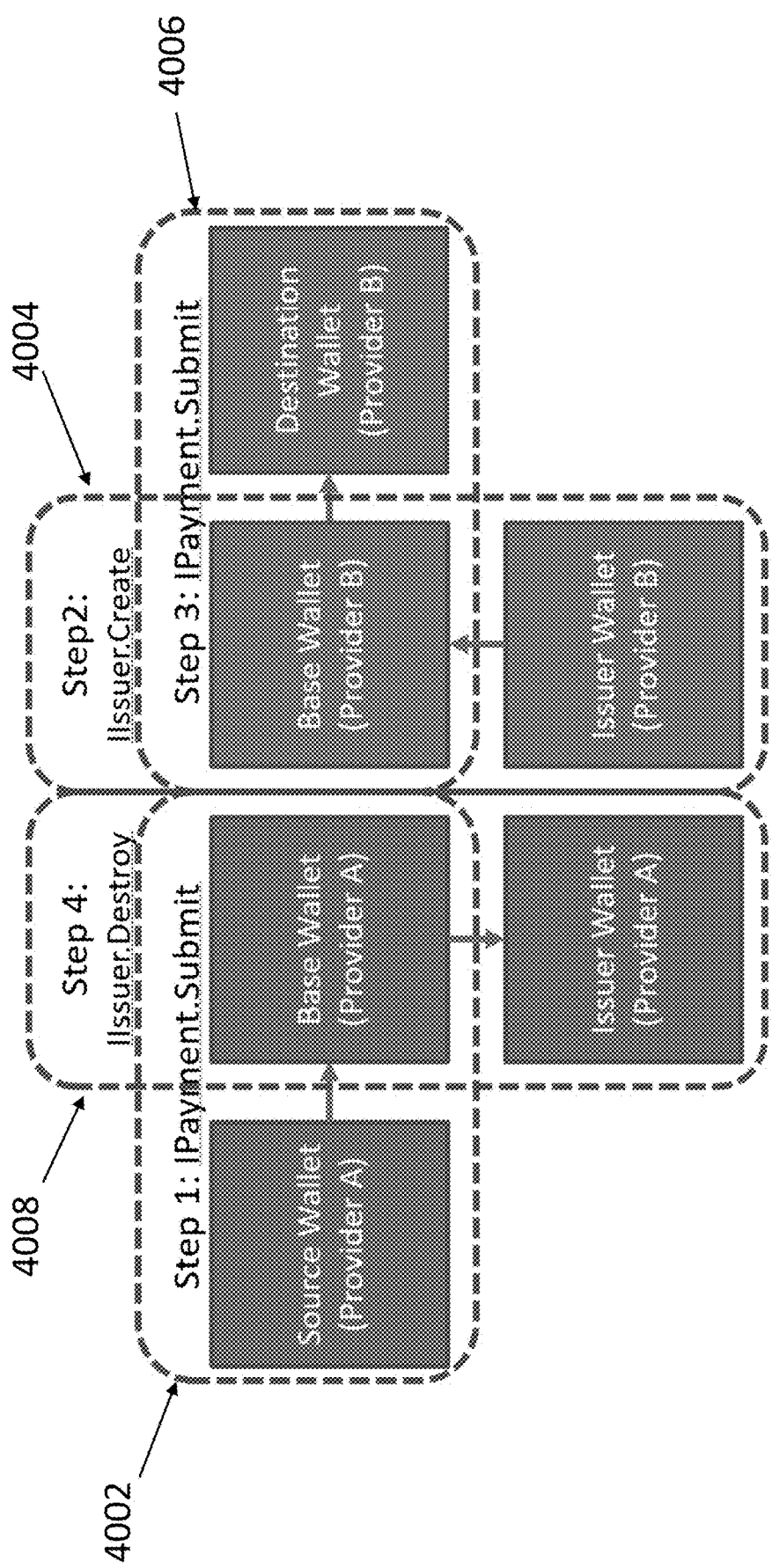
FIG. 4 is schematic diagram of an example of a chain of sub transactions for accomplishing a cross ledger mutation in accordance with disclosed implementations.

An example of a chain of sub-transactions for accomplishing a cross ledger transmutation, that is the creation of one unit of value corresponding with the destruction of another, is illustrated in the flowchart of FIG. 4. An example of a transmutation transaction is the movement of share representing beneficial ownership from one ledger to another. At 4002, Value is sent from Source Wallet to Base (Escrow) Wallet using Provider A. This wallet is the Bridge Inbound Wallet. At 4004, tokens are issued from Provider B Issuer Wallet and sent to the Base Wallet on Provider B (Bridge Outbound Wallet based on Bridge attributes). At 4006, base wallet on Provider B sends value to Destination Wallet on Provider B. At 4008, on transaction completion, equivalent number of tokens are destroyed from Provider A Base Wallet. Note that this process assumes that Chained Transfer Handler module 2004 has a mechanism to detect and attribute transactions on the source and destination ledger and a mechanism to create tokens on Provider B and burn (destroy) tokens from the Base Wallet on Provider A. Access to these authorities can be indicated by bridge metadata. Also, it is possible to skip steps 4004 and 4008 by issuing and burning tokens directly through the issuer wallet.

In some cases, it may be desirable to convert the rights represented in tokens from one form to another. For example, it may be desirable to convert the loan rights represented in a convertible note into an equity position. In this case, a fixed ratio transform (e.g. 1 share debt=1 share equity or 10 shares debt=1 share equity) using the earlier transmute function can be used. However, it may be useful to split rights in a common share into separate tokens that function differently with one representing voting rights and the other representing beneficial ownership of income or equity proceeds. In this case, a custom transaction transform Bridge is required. For each type of token delivered to the inbound wallet, more than 1 type of share may be produced and delivered to the destination. The basic sequence of a Transform transaction is the same as a Transmute transaction, but the Bridge must execute instructions to issue 2 or more types of instruments on the outbound transaction and must deliver each instrument to the desired destination wallet. The reverse transaction may be conducted to combine rights into a new composite right (e.g. combine voting and beneficial ownership into a common share). A transform Bridge can be an intra-ledger bridge, i.e. need not span multiple networks.

Exchange Bridges are a special kind of Bridge where Price Discovery or Movement of funds involves an exchange inline or Out Of Band (OOB). In this case, the amount of funds required for the source transaction depends on the current Total Volume Price (integral of order book) of the equivalent trade on an exchange. Funds are then replenished inline or Out of Band in batch. In some cases, the inbound transfer may be to an exchange account for inline transactions. In this case the Nostro account, would also reside in the exchange. Nostro accounts may use the same provider as the Vostro account if exchange is not available via the Provider network but different currencies are supported. Other types of bridges are discussed below with respect to FIGS. 10 and 11.

The disclosed implementations include Transaction Service Bus module 2002, also known as "InfinXchange™", an interface architecture that includes libraries that map and serve interfaces and data structures Transaction Service Bus for DLT and traditional value transfer networks (e.g., Ethereum, PayPal, SWIFT) and value transfer models. As noted above, the interface(s) required by a Bridge can be specified in the Bridge metadata. These interfaces expose the functions required to execute procedures used for transformation transactions. The InfinXchange wrappers implement a hub and spoke model for integration, through which dependent services, like Chained Transfer Handler module 2004, only need to integrate with the required interface once to orchestrate transactions across wrapped transfer networks.

Transaction Service Bus module 2002 can be implemented as an abstraction layer that provides a common interface for intra-ledger transactions. To participate in a cross-ledger transaction as either the source or destination ledger, a transaction provider can be wrapped in an InfinXchange wrapper. The wrapper is an executable that integrates with the underlying transfer provider to execute transactions and react to activity in the network. The wrapper exposes common interfaces as defined in the finance ontology. These interfaces decouple business and transaction logic associated with chaining from the specific implementation details of a transaction provider and permit broad reuse of transaction patterns.

Transaction providers/networks vary broadly in implementation and integration patterns. For example, blockchain networks require a client that interacts with the nodes while many payment networks expose APIs. APIs are implemented using REST, SOAP, RPC, and other patterns. Corporate accounting systems often run on relational databases with no specific pattern for integration. A Transaction Service Bus module library can be developed to integrate with a transaction provider implemented in any of these styles to provide a common pattern for interacting with the underlying service.

Transaction Service Bus module libraries connecting to each provider can be injected into the chained Transfer handler module 2004 using an abstract factory pattern. The abstract factory pattern is a known mechanism for encapsulating a group of individual factories that have a common theme without specifying their concrete classes. For example, client software can create a concrete implementation of the abstract factory and then use the generic interface of the factory to create the concrete objects that are part of the theme. Factory patterns separate the details of implementation of a set of objects from their general usage.

Again, interfaces that define the connections are found in the finance ontology. As a provider is initialized, it publishes its support for service interfaces and functions to the calling service. This enables the calling service to identify the services and methods that are supported by the transaction provider. Using this information, the calling service can determine the eligibility of a provider to support a transaction type. Any provider participating in a chained transaction should support the IPaymentService abstraction. A short list of frequently used services from the Finance Ontology are described below.

IPaymentService: executes all transfers of value. Functions include: estimating costs for a transaction, executing the payment, validating its completion, and obtaining a list of payments from the source IWalletReaderService: identifies account balances (the amount of value available at a particular wallet address) and is used to obtain details about the wallet (e.g., supported currencies, date created)

IWalletValidatorService: determines if a wallet is eligible for transactions, including ownership by the entity claiming it.

The IPayment service and IIssuer service can layer over any payment system and execute transfers via that provider. Example pseudo code and related data structures for the interfaces can be found immediately below.

```
public interface IIssuerService
{
    /// <summary>
    /// Issues an amount of new tokens to a designated wallet.
    /// </summary>
    Task<ITransaction> IssueAsync(IWalletIssuerActive wallet,
IAmount amount);
    /// <summary>
    /// Destroys an amount of new tokens from a designated wallet.
    /// </summary>
    Task<ITransaction> DestroyAsync(IWalletIssuerActive wallet,
IAmount amount);
    /// <summary>
    /// Freezes a token.
    /// </summary>
    Task<ITransaction> FreezeAsync(IWalletIssuerActive wallet,
IToken token);
    /// <summary>
    /// Retrieves token details.
    /// </summary>
    Task<ITokenDetail> GetTokenDetails(IWalletActive wallet, IToken
token);
}
public interface IPaymentService
{
    /// <summary>
    /// Calculates available routes to deliver amount to designated
wallet.
    /// </summary>
Task<List<IPaymentOption>> PrepareAsync(IWalletActive wallet,
IWallet destinationWallet, IAmount amount, IFilter filter = null);
    /// <summary>
    /// Executes payment using IPaymentOption path using authority of
active wallet
    /// </summary>
Task<ITransaction> SubmitAsync(IWalletActive wallet, IPaymentOption
payment);
    /// <summary>
    /// Cancels ongoing payment transaction using authority of active
wallet
    /// </summary>
    /// <remarks>
    /// Not all providers will support this action
    /// </remarks>
    Task<ITransaction> CancelAsync(IWalletActive wallet, string
uuid);
    Event Complete(ITransaction trans);
}
```

Figure 5:
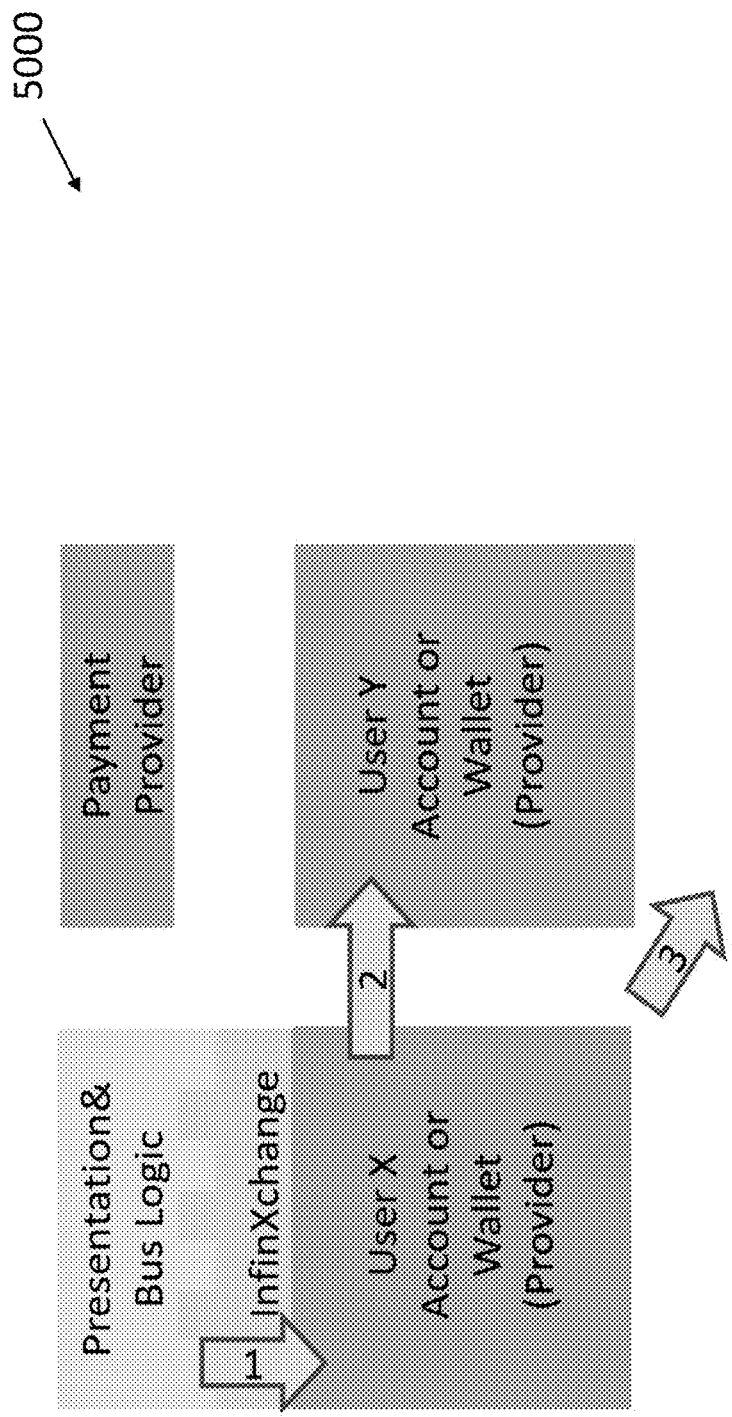
FIG. 5 is a schematic diagram of an example of a simple value transfer in accordance with disclosed implementations.

To understand application of Transaction Service Bus module 2002 to complex cross-ledger transfers, it is helpful to first explore how simple payment systems work in the context of the Transaction Service Bus module 2002. FIG. 5 schematically illustrates an example 5000 of a simple transfer. User X (sender) would like to send value to User Y (recipient) on the same ledger (for example, a PayPal transfer). First, the sender will propose a transfer by specifying the function (IPaymentService.Prepare) the recipient (by address) and the currency/amount to be sent (usually denoted in the amount the recipient expects to receive). The system will check the validity of the proposed payment (assess fees/gas, policy, valid recipient, sufficient funds) and will respond with one or more options (in many systems there is only one available option) regarding the amount which must be sent to achieve the desired delivery. If the transfer terms are acceptable for an option, the sender will initiate the transfer (Step 1, PaymentService.Submit) with a signed transaction (login, secret, etc). The system validates the transfer (Step 2, event IPaymentService.Initiated) and moves value by adjusting account balances (reducing source and increasing destination balances) while extracting a transfer fee (Step 3). On completion of the transaction, notification is sent (event IPaymentService.Completed). The new balances are reflected in the source and destination wallets.

Figure 6:
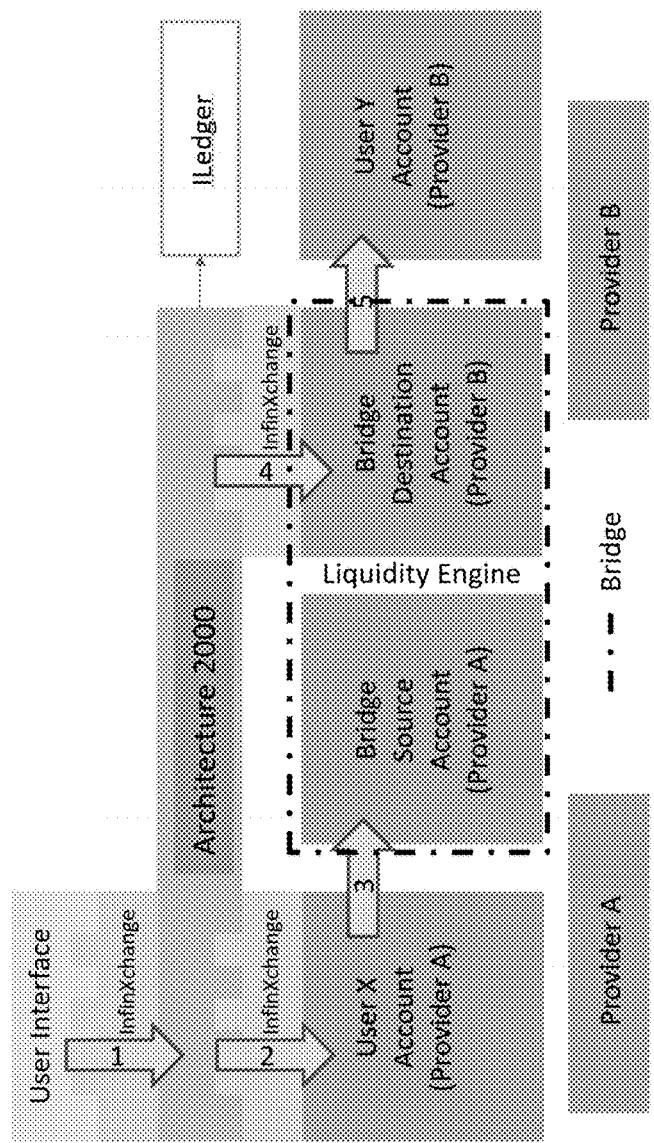
FIG. 6 is a schematic diagram of an example of a chained transaction in accordance with disclosed implementations.

A chained transaction in accordance with disclosed implementations may be initiated using these same functions in combination with novel elements of the disclosed implementations. FIG. 6 schematically illustrates an example 6000 of a chained transaction (including multiple sub-transactions to be accomplished in a specified order) in accordance with disclosed implementations. The example in FIG. 6 can use architecture 2000 of FIG. 2 to accomplish the transaction. Individual ledger transfers in the chain use methods consistent with a simple payment with coordinating activities managed by Chained Transfer Handler module 2004 of FIG. 2.

As shown in FIG. 6, the sender proposes a transfer (IPaymentService.Prepare) using the InfinXchange interface. In this example, user X desires to transfer value from and account on Provider A (a first DLT Network for example) user Y's Account on Provider B (a second DLT network for example). At step 1, the Route Planning Service module 2006 FIG. 2 looks for available paths by traversing the node graph (such as node graph 3000 of FIG. 3A) to identify Bridges that can provide a viable path between the source and destination networks, based on the bridge metadata, and obtaining fees for each leg of the transfer. There may be 0 to many paths available for facilitate the transfer. Various techniques (including artificial intelligence may be used to narrow the list of available options or to prioritize the possible paths. The paths can include all necessary InfinXchange interfaces and business logic derived from the bridge metadata.

The sender, or an automated algorithm, can select the desired path and initiate the desired transfer (IPaymentService.Submit). Chained Transfer Handler module 2004 writes the transaction to a ledger of System Transaction Ledger 2013 (FIG. 2) to ensure auditability and recoverability in the result of system failure. This record may be obfuscated using Zero Knowledge Proof techniques to provide immutability without compromising transaction privacy. Chained Transfer Handler module 2004 also publishes an event (IPaymentService.Initiated) to signal the transfer. Chained Transfer Handler module 2004 conveys the user's signing authority to execute a child transfer on the source ledger using the planned route by the IPaymentService.Submit function (Step 2) which includes traversal of dissimilar networks via one or more Bridges. On initiation of the sub transfer, an event is thrown (IPaymentService.Initiated) as this transfer is linked to the parent transaction in the external transaction ledger. On completion of the transfer to the source bridge account (IPaymentService.Completed), an event is thrown to mark the completion of the transfer signaling the handler to initiate the next part of the transaction. A transfer is initiated via the bridge (IBridgeService.Submit). On completion of the bridge transfer (IBridgeService.Completed), Chained Transfer Handler module 2004 initiates the transfer on the outbound ledger using IPaymentService.Submit (Step 4)) to deliver to the value to the destination account or another leg in the chain depending on the route. An event is thrown on the initiation of this transaction (IPaymentService.Initiated). This transaction is linked to the parent transaction in the external transaction ledger of Independent Transaction Ledger module 2012. The value is delivered to the destination account and an event is thrown (IPaymentService.Completed) at Step 5. As the last step in the chained sequence, and event is thrown signaling the completion of all transactions. All sub-transactions are recorded to the ledger of System Transaction ledger 2012.

Alternatively, a chained transfer can be initiated from an external system, skipping Step 1 and Step 2 of FIG. 6, by delivering value to a bridge source account with instructions for delivery to the destination. On receipt, the bridge account issues an IPaymentService.Completed transfer. The Chained Transfer Handler module 2004 reads this event and determines if there is a legitimate payment route. If a route is available, the chain is initiated with the funds held in escrow at the bridge source account. If the transfer succeeds, these funds are released. If the transfer fails, the funds may be returned to the source. If the source ledger supports smart contracts, the initiating transaction can leverage on-chain escrow methods to ensure atomicity of the transaction.

Figure 7:
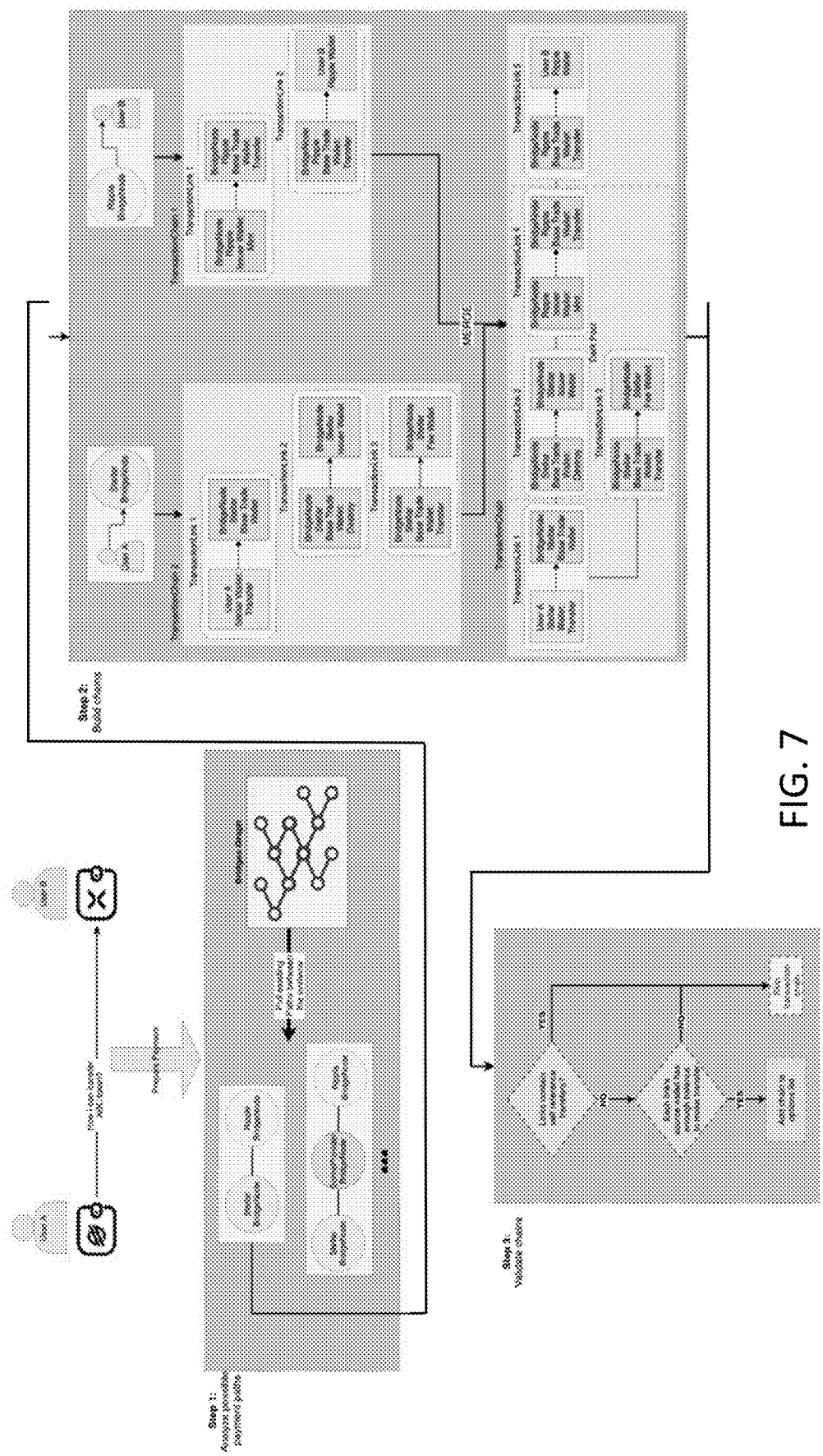
FIG. 7 is a schematic diagram of an example transaction chain building process in accordance with disclosed implementations.

FIG. 7 is a schematic illustration of an example transaction chain building process in accordance with disclosed implementations. The illustrated process can be accomplished by the architecture of FIG. 2. A Route Planning Service module 2006 in combination with InfinXchange™ wrappers, to identify optimal transmission paths across network nodes, given the transaction specified in a transaction data structure. In this example, the specified transaction is "transfer ABC token from User A node on Stellar DLT Systems to User B node on Ripple DLT System". A set of all available options, such as price, and expected delivery time can be specified by the transaction data structure. At Step 1, Route Planning Service module 2006 evaluates all possible routes and available bridges to execute the transfer by traversing the graph of all nodes and Bridges. Possible transaction paths are analyzed by reading bridge metadata for the relevant networks and builds a Bridge Graph that represents all connections between the source ledger (Steller in this example) and destination ledger (Ripple in this example) providers and tokens. The Bridge graph can include all relevant bridge metadata of the Bridges for the identified connections.

Route Planning Service module 2006 can apply a Breadth First Search (BFS) algorithm (a known graph traversal algorithm that traverses a graph layer-wise from a selected node) to find all paths and return a list of BridgeNodeChains, i.e., a list of possible paths for accomplishing the transaction. In this example, two possible paths are identified (TransactionChain 1 and TransactionChain 2). At Step 2, Route Planning Service module 2006 constructs the ultimate transaction path, based on the list and transactional requirements and conditions. For example, where the chain must deliver 1 ABC token to destination wallet and the sum of associated transmission fees equal 0.1 ABC token, the Source must transfer 1.1 ABC tokens. The ultimate transaction path can be constructed to consider various preferences and attributes, such as transaction fees, time for transaction confirmation, and the like.

FIG. 3A can be used to better illustrate the selection of paths and transaction chains. Recall that, in FIG. 3A, Graph 3000 has three DLT networks, each having at least one node. Transactions may occur within a network (e.g., A→B, Y→Z). However, in order to cross between networks, for example transact between nodes that are in different DLT networks, a bridge must be used. Without bridges, no path exists for transfer between, for example, nodes A and Z. To link the networks, bridging accounts B, M, and Y are created. Bridges are then set up to link these accounts. Using Bridge 1, a route between, for example A and Z, exists (A→B~1~Y→Z). A second route exists by linking through a third-party network (A→B~2~M~3~Y→Z). A route planner of Route Planning Service module 2006 traverses the network graph and generates these routes as potential routes. A user (or an automated service) can decide the best transfer path from the identified options based on preferences and other attributes.

Returning to FIG. 7, the ability to move value from one network or ledger to another may involve many potential paths and mechanisms or may have no viable path at all. When a user requests payment delivery, a set of all available options, their price, and expected delivery time must be generated in substantially real time. At Step 2 of FIG. 7, Route Planning Service module 2004 gathers all possible routes by evaluating all available bridges that can provide a path from a source node to a destination node.

When all abstract paths have been calculated, Route Planning Service module 2006 builds one or more transaction chains based on abstract paths. There are at least two ways to build the chains, start building from Destination (default), or from Source. When starting from Destination to Source, Route Planning Service module 2006 begins with destination conditions as the fixed point. When starting with the source node as the fixed parameter, Route Planning Service module 2006 determines the value the destination node will receive if the transfer begins with 1 ABC. Route Planning Service module 2006 starts building transaction links from source and accumulates all fees and exchanges through the path. For example, if all fees equal 0.1 ABC token, the receiver will get 0.9 ABC token in the end. Route Planning Service module 2006 then builds an abstract path to the real chain based on, for example, the following rules:

| Case | Description | Transaction Chain |
| --- | --- | --- |
| Bridge node -> Bridge node | based on Bridge node configuration, the builder may return either zero link or several. If bridge node currencies are different, and bridge node contains issuer wallet, transaction builder adds 2 links: issue token 1 from issuer to base trade, exchange token, destroy token 2 to issuer. | Link 1: Bridge Issuer wallet → Bridge Base Trade wallet (hidden for user) Link 2: Bridge Base Trade wallet → Bridge Issuer wallet (hidden for user) |
| Bridge node -> Destination wallet | based on Bridge node configuration, the builder may return either one link or several. The first link is a transfer from Bridge Base trade wallet to destination wallet. If Bridge node contains Issuer wallet, transaction chain builder adds a link issue tokens. This link goes as a Dark Pool and hidden for user If Bridge node contains Fee account, | Link 1: Bridge Base Trade wallet → Destination wallet Link 2: Bridge Issuer wallet → Bridge Base Trade wallet (hidden for user) Link3: Bridge Base Trade wallet → Bridge |

-continued

| Case | Description | Transaction Chain |
|---|---|---|
| | transaction chain builder adds a link with transfer fee from bridge base trade account to the fee account. This link goes as a Dark Pool and hidden for user | Fee wallet (hidden for user) |
| Source wallet -> Bridge node | based on Bridge node configuration, the builder may return either one link or several. The first link is a transfer from user to Bridge Base trade wallet. If Bridge node contains Issuer wallet, transaction chain builder adds a link to the chain to destroy tokens. This link goes as a Dark Pool and hidden for user If Bridge node contains Fee account, transaction chain builder adds a link with transfer fee from base trade account to the fee account. This link goes as a Dark Pool and hidden for user | Link 1: Source wallet → Bridge Base Trade wallet Link2: Bridge Base Trade wallet → Bridge Issuer wallet (hidden for user) Link3: Bridge Base Trade wallet → Bridge Fee wallet (hidden for user) |
| Source wallet -> Destination wallet | this is a case (empty bridge node chain) when the transfer goes within one ledger, so this transfer doesn't require bridges. Adds single link in a chain. | Source wallet → Destination wallet |

Route Planning Service module 2006 then selects all path chains and merges them into the single final transaction chain by removing duplicate links. As shown in FIG. 7, the transaction chain includes TransactionLink 1, TransactionLink 2, TransactionLink 3, TransactionLink 4, and TransactionLink 5. At Step 3 of FIG. 7, a TransactionValidationService validates that the transaction paths can be executed, for example, by checking whether each link source wallet in a path has sufficient balance to submit the transaction and/or checking for self-referencing chains, i.e., where the same node occurs more than once in a chain. (A Policy Engine can verify regulatory compliance at each transfer node. For example, the system and methods described in US Published Patent Application No. US20190164151 A1 can be used to verify regulatory compliance.) Each viable transaction chain may involve fees and exchanges and will have an estimated delivery time. The price of a proposed transfer and the delivery time can be calculated to present to the user prior to user approval of a transfer action.

During a transfer in the chain of sub-transactions, it is possible that a network failure occurs, or the transfer is cancelled (if allowed) prior to completion. In this case a rollback is required. In cases where intermediate fees are charged or exchanges are performed, it may not be possible to reverse the transaction without a loss in value. For these cases, a user may exercise choice to restart the transfer chain to proceed to completion, rollback the transfer, or abandon the transaction by claiming the value in its current state. A successful chain of four sub-transactions (to accomplish a desired transfer transaction) is illustrated at 8002 in FIG. 8. All four sub transactions (8002a, 8002b, 8002c, and 8002d) are successful.

Figure 8:
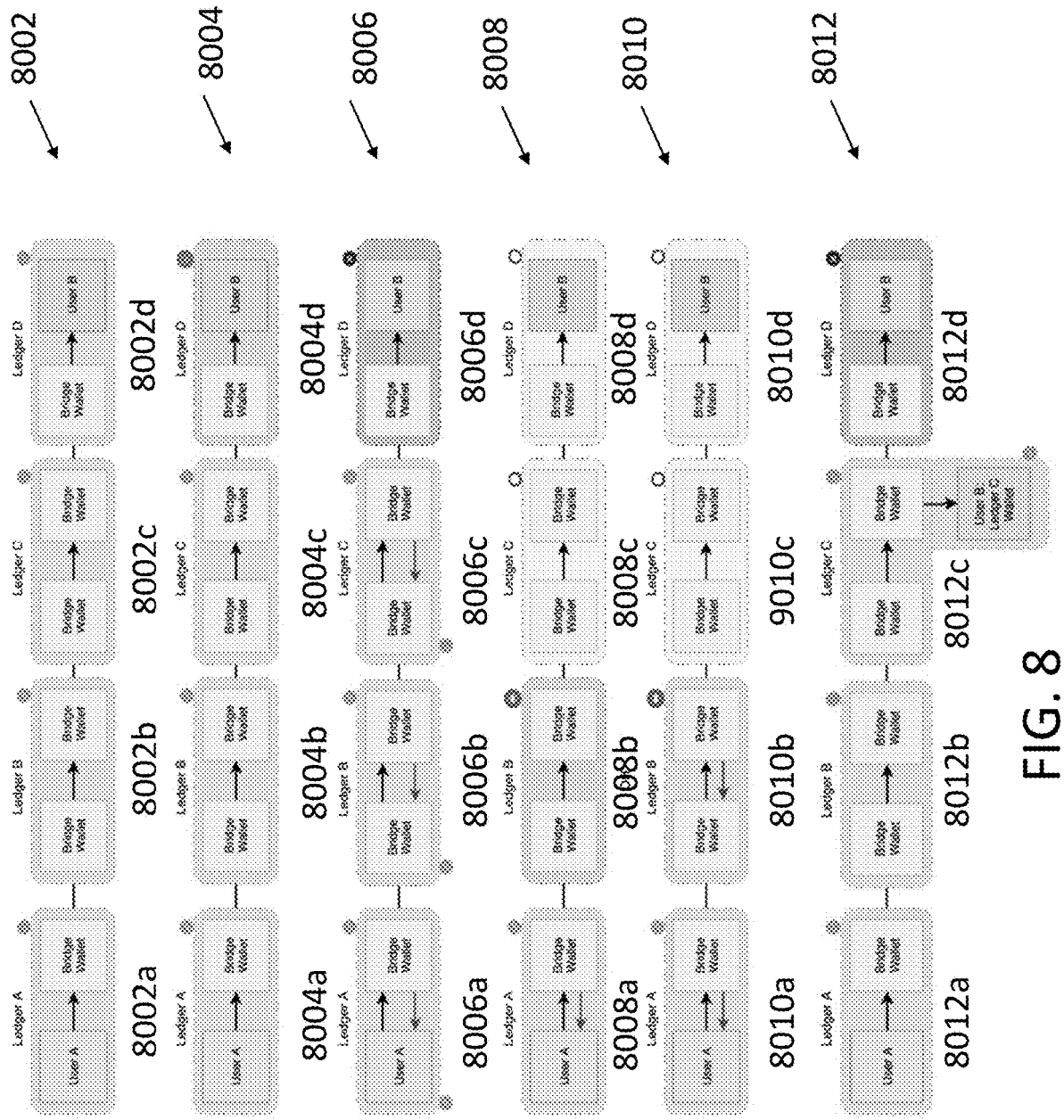
FIG. 8 is a schematic diagram of chained transfers in accordance with disclosed implementations.
Figure 9A:
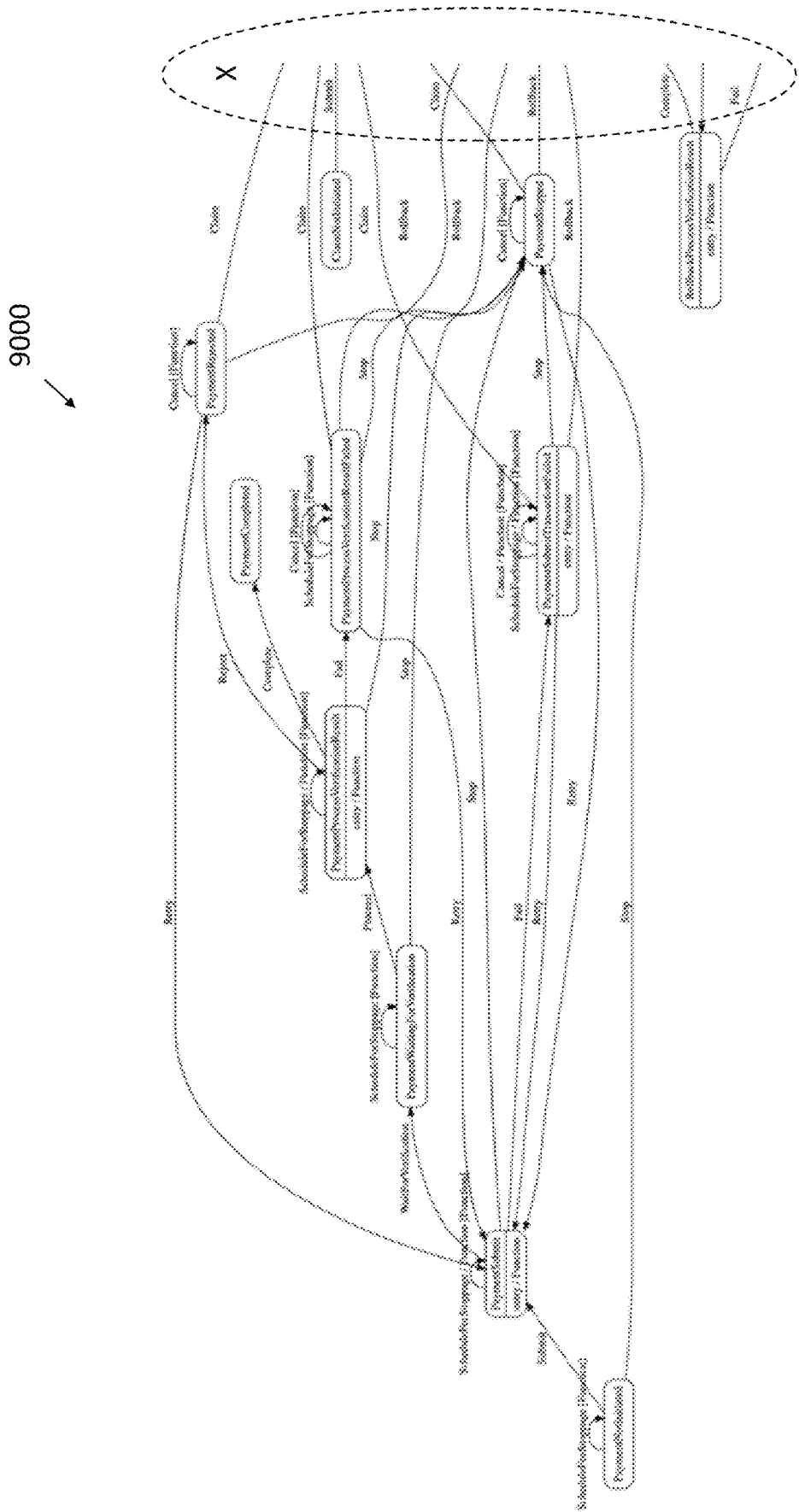
FIGS. 9A and B, in combination, illustrate an example of state diagram for chained transfers in accordance with disclosed implementations.
Figure 9B:
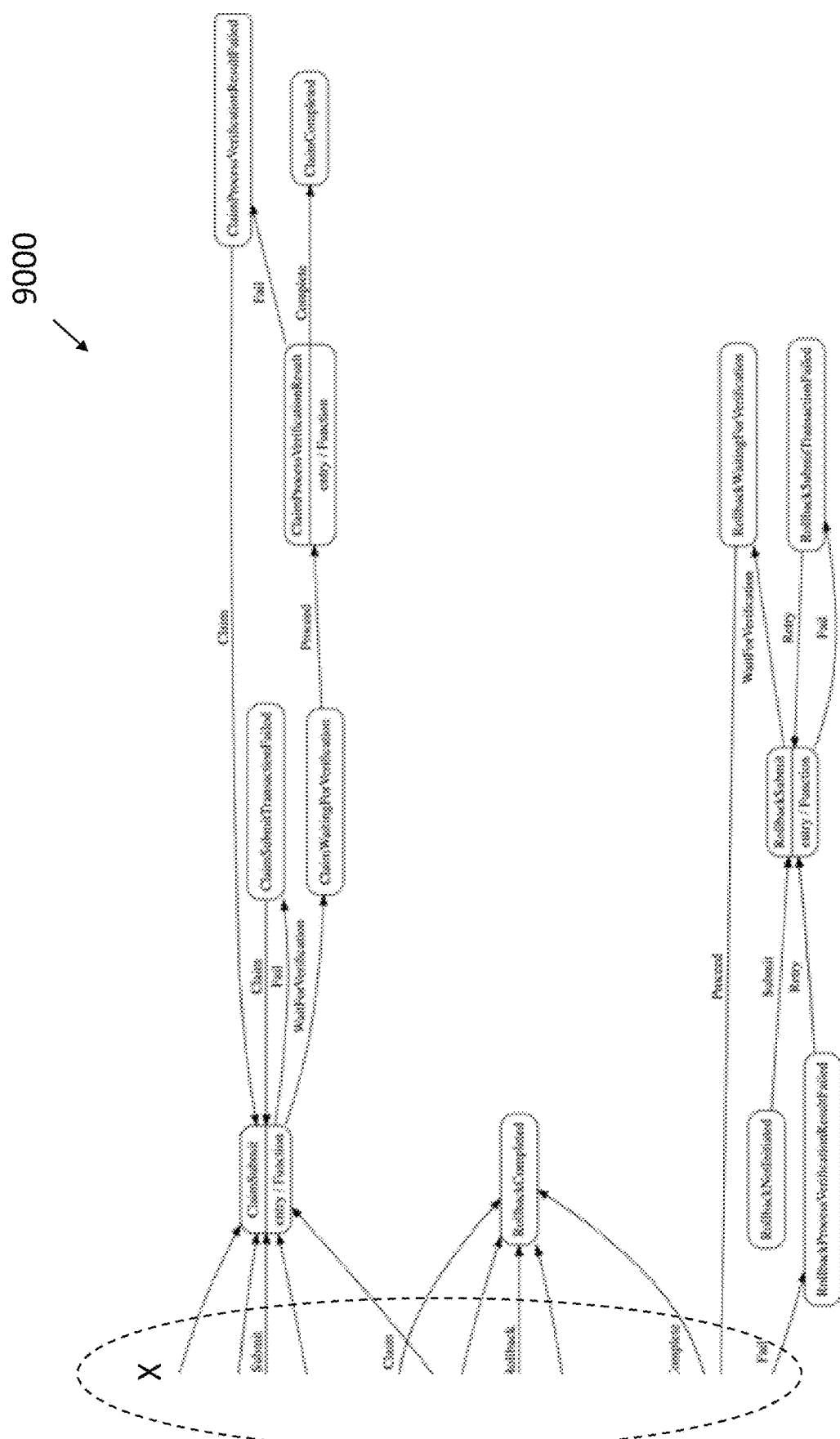

However, depending on the configuration of the bridge, upon a transaction failure, the system may automatically conduct a restart to deliver the value or may halt and await user input. 8004 of FIG. 8 illustrates a chained transaction in which sub transaction 8004d has failed. Depending on the configuration, upon a failure, the chain may automatically initiate a rollback transaction. Rollback transactions are only possible if each bridge used in a route are two-way bridges capable of supporting transactions in both directions. 8006 of FIG. 8 illustrates a rollback transaction. At 8006, sub transaction 8006d has failed and this all sub transactions 8006a, 8006b, and 8006c are "reversed" by accomplishing a reverse sub transaction for each of these sub transactions. Further, as shown at 8008 and 8010, transactions may be cancelled en route. In transaction 8008, sub transaction 8008b has been cancelled prior to execution and thus sub transaction 8008a has been reversed. Alternatively, at 8010, sub transaction 8010b has been cancelled after execution and sub transactions 9010a and 8010b are both reversed. Alternatively, if the transaction initiator has the means to receive value via an intermediate ledger, the value may be claimed directly from a halted transaction as shown at 8012. All sub transactions, including reversal transactions, are recorded on system transaction ledger module 2012. FIGS. 9A and B, in combination, illustrate an example of state diagram 9000 for chained transfers.

Each viable route may involve fees and exchanges and will have an estimated delivery time. The price of a proposed transfer must be calculated to present to the user to support a transfer action. Chained Transfer Handler 2004 is designed to provide a manageable alternative to Atomicity (A) and to deliver Consistency (C), Isolation (I), and Durability (D) consistent with ACID (see https://en.wikipedia.org/wiki/ACID_(computer_science) payment delivery). Chained Transfer Handler module 2004 orchestrates cross ledger payments by providing the following functions: ledger interoperability, route planning, price and fee discovery, transaction management, transaction state, and logging. Chained Transfer Handler module 2004 ensures high reliability end-to-end transfer across networks by:

publishing the proposed end-to-end transaction and all sub transactions to a ledger (such as System Transaction Ledger 2012), with zero knowledge proofs, as they execute for traceability and reliability;
  sequencing transfers using an interoperability framework that leverages transfer capabilities in each network the transaction traverses; and
  ensuring each transaction is executed successfully (or rollback) to deliver value successfully.

Isolation (I) is provided via the common IPaymentService plugin which isolates each individual ledger transaction as a component in a larger flow. This plugin framework provides a common model for processing transactions across dissimilar ledgers. Transaction Management: Transaction management provides for the Durability (D) of chained payments. The CTH manages each step of a complex payment sequence to ensure it is executed even in the face of an outage or payment network failure. This component handles parallel or series transactions and executes payment and bridging transactions.

Due to irreversibility of certain transactions (because of fees), long delivery timeframes and frequently changing market conditions that characterize certain chained payments, Atomicity (A) cannot be guaranteed. To provide for slippage (changes in exchange rates or fees from the initiation of a transaction until its completion), the CTH can freeze a transaction in the event of a significant change to allow the user to weigh in regarding the willingness to continue. At this point the transaction may be rolled back (at the expense of fees), the value may be claimed in its existing form, or the transaction may be restarted to proceed to completion (with the user accepting the changed terms).

Since chained transactions may involve more than one ledger, none of the individual ledgers involved will contain end to end traceability of the transaction. To ensure Consistency (C), an overarching ledger is maintained by Independent Transaction Ledger module 2012 to track the overall transaction as well as links to each of the sub-transactions. Chained transfers may occur in series or parallel depending on Bridge configuration. Parallel payments are fastest but may require rollback locks and hedging due to risks in time latency of inbound deliveries. Series deliveries may require significant use of slippage management and require locking of outbound funds to support delays in inbound transactions.

When operating in series, Bridges await verification of the completion (IPayment.Complete event) of the initiating transaction (inbound) prior to initiating the chained transaction (outbound). When operating in parallel, Outbound transactions may initiate immediately after verification of initiation (IPayment.Initiated event) of an Inbound transaction. For parallel operations, the Bridge operator takes delivery risk if the Inbound (and all intermediate) transactions are cancelled or rolled back. Often the Bridge Operator will only allow parallel operations if the inbound network does not allow cancellation or rollback. Alternatively, the Bridge Operator may require collateral or charge a large fee to compensate for delivery risk. For series operations, the initiator may experience slippage risk, that is, a change in price for delivery from the initial terms presented on the initiation of the transaction. For example, downstream networks fees or exchange rates may have changed from the time the transaction is initiated. The Bridge Operator may provide a price guarantee (no slippage) but will often build in a fee to compensate for market changes or hedging strategies.

As is apparent above, in addition to providing a path for transactions across dissimilar network, Bridges can have various logical functions. A deposit is a special example of a bridging function. It involves a Peg linking deposited funds to an equivalent amount of tokens (Hypothecated Assets or IOUs) which are delivered to the user's internal account. IOUs can be transferred to other users or traded for assets via centralized or decentralized exchanges. These tokens can be redeemed (settled) for the value in the counterparty account by using the opposite flow, that is, a withdrawal.

Account balances in the Counterparty pool should exactly match the total number of internal tokens in circulation. Both balances should be published to users. Some networks support token creation and destruction, whereas others require movement in and out circulation via cold wallets.

Figure 10:
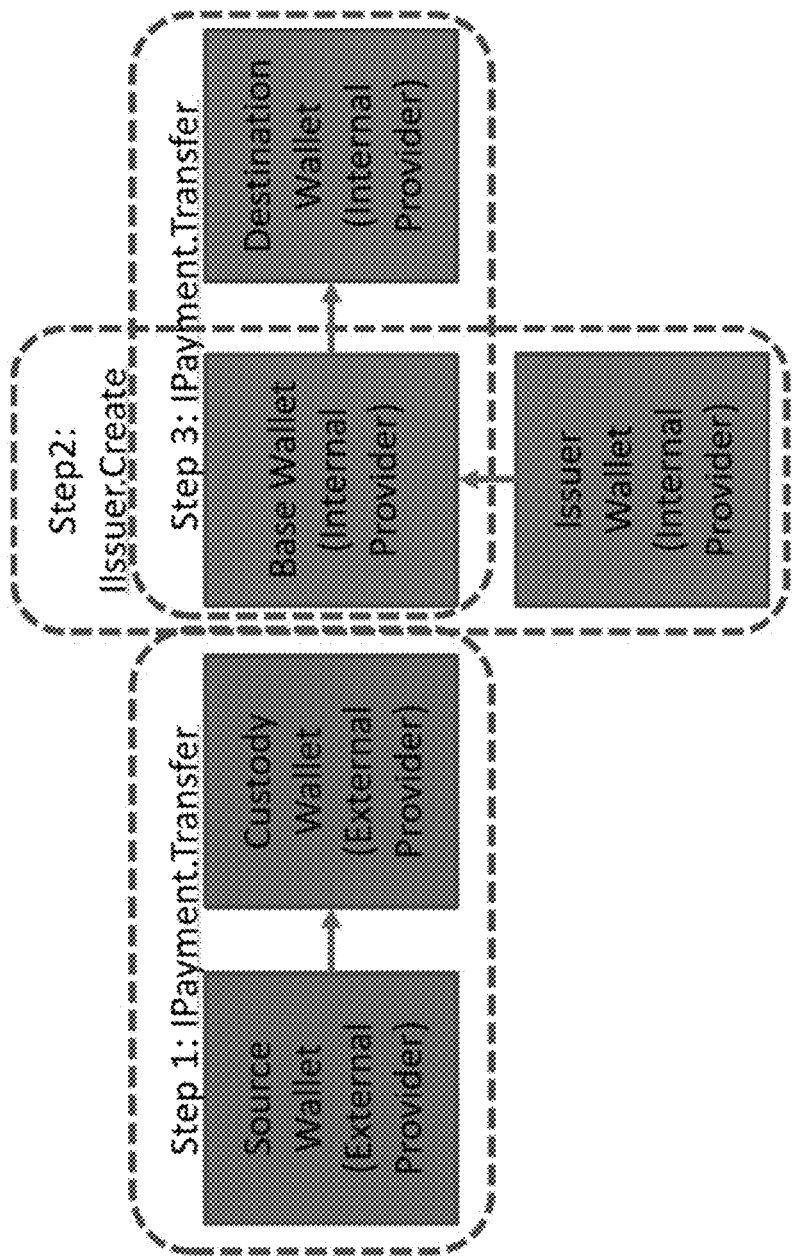
FIG. 10 schematically illustrates an example of the operations for a Bridge accomplishing a hypothecation transfer in accordance with disclosed implementations.

FIG. 10 schematically illustrates an example of the operations for a Bridge accomplishing a hypothecation transfer. At Step 1, value is sent from Source Wallet to Custody Wallet (Bridge Inbound) using an external provider (e.g., OOB, Cascade, PayPal, Ethereum). At Step 2, and equivalent number of IOUs (a digital version of the deposited amount) are issued from Issuer wallet and sent to the Base wallet. At Step 3, Base wallet (Bridge Outbound) enacts IPayment.Transfer send value to Destination Wallet on Internal Provider. This pattern requires the Chained Transfer Handler module 2004 to have the means to detect and attribute transactions on the source ledger and execute transactions from the Issuer Wallet and Base Wallet. Access to this authority can be granted at Bridge setup. Note that it is possible to skip Step 2 and send directly from Issuer Wallet to Destination Wallet.

Figure 11:
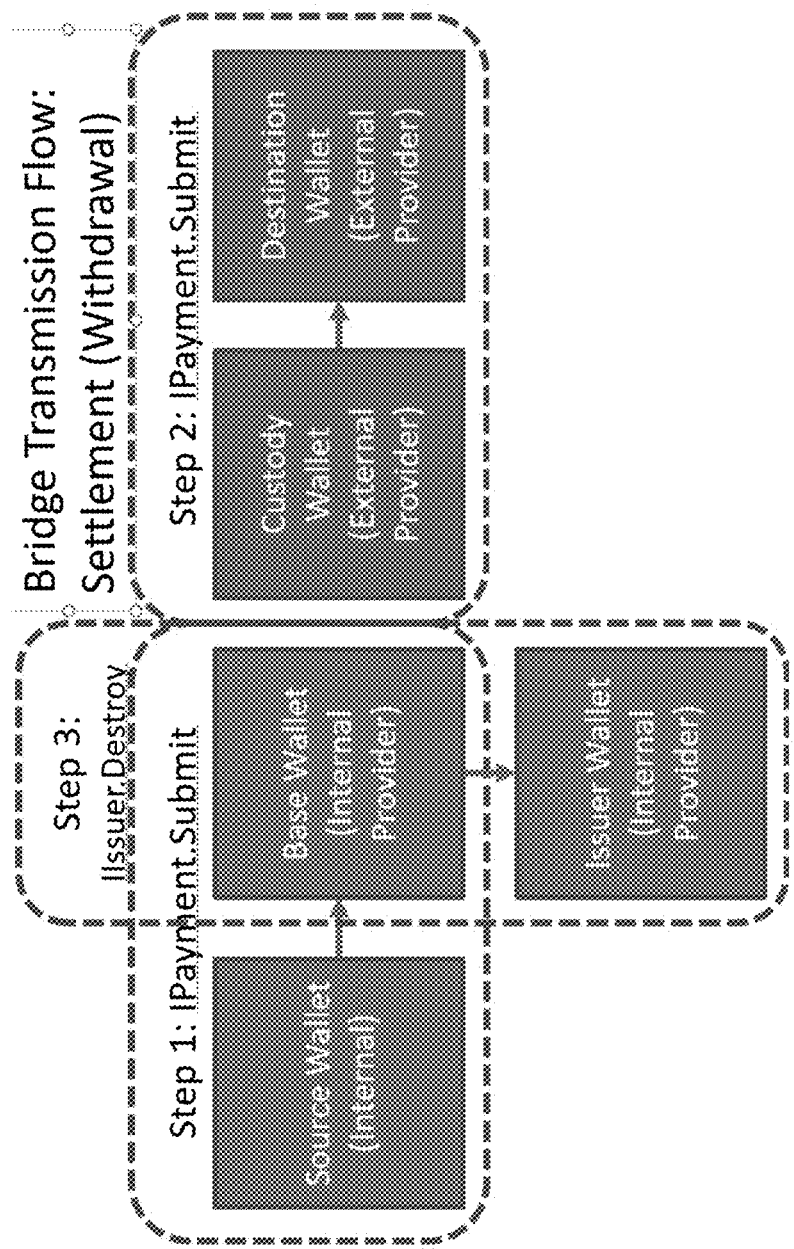
FIG. 11 schematically illustrates an example of the operations for a Bridge accomplishing a settlement transfer in accordance with disclosed implementations.

Settlement is the reverse of a Hypothecation transfer. When the user desires to remove value from a ledger and return the value to its original form, a transfer is initiated that traverses a settlement bridge. FIG. 11 schematically illustrates an example of the operation of operations for a Bridge accomplishing a settlement transfer. At Step 1, value is sent from Source Wallet to Base Account (Bridge Inbound) using External provider (e.g., OOB, Cascade, PayPal. At Step 2, Custody Wallet (Bridge Outbound) enacts IGateway Payment to send value to Destination Wallet. At Step 3, in response to completion of the previous step, an equivalent number of IOUs (digital version of the settlement amount) are burned (i.e., destroyed) from the Base (escrow) Wallet. This pattern requires the Chained Transfer Handler module 2004 to have the means to detect and attribute transactions on the source ledger and execute transactions from the Custody Wallet, and burn tokens from the Base Wallet. Access to this authority can be granted as part of the Bridge setup. Also, it is possible to skip Step 3 and receive directly to the Issuer Wallet from the Source Wallet if the authority exists to reverse the burn if the transaction fails.

Cross Ledger Transmutation can be used for Multi-Ledger issuances. For example, it is used when the official record of ownership is separate from the ledgers being used for transfer, or is the official record is the sum of ownership records on affected ledgers. With an InfinXchange™ summing mechanism that exists above specific ledgers, transmutation permits tokens to be issued on multiple ledgers and/or provides a means by which tokens issued on one ledger can "flow" to another. As tokens move from ledger to ledger, the total number of tokens in circulation remains constant while the ownership record moves from ledger to ledger. This type of Bridge couples a withdrawal and deposit function. By removing tokens from one ledger at the same time tokens are introduced into circulation in another, the total number of tokens remains constant. Funds exiting a ledger are sent to the Source Ledger Base Wallet. This transfer may also be an escrow transaction placing a hold on the tokens without moving them. An equivalent number of tokens are issued into circulation on the Destination Ledger from the Issuer (wallet, account, or smart contract) or Cold Wallet to the Outbound Wallet on Provider B for delivery to the destination. On successful delivery, the IIssuer.Destroy function called on the source ledger removing the tokens from circulation.

Out-Of-Band Transfer module 2104 provides out of band (OOB) processing in cases where value transfer path legs cannot be fully automated within the system. Interfaces are provided to enable third parties to signal and provide data to applicant's system to facilitate processing execution. For example, in the case in which Bridges may only support a one-way flow of funds across networks, a fund imbalance may accumulate and OOB transactions may be required to restore balance. Managing OOB time lags and proper prepositioning of funds in the Outbound account is a logistics problem with firmly established mathematical models for control. Price Discovery is facilitated through the operation of the Price and Liquidity module 2010 (FIG. 2). This module may adjust price through market functions to maintain a balance between Inbound and Outbound account levels. External markets can be used to replenish liquidity. Darkpool owners (those who contribute assets to the pool) receive income from fees linked to pool usage. The Price and Liquidity module 2010 is designed to manage liquidity between ecosystems, currencies, asset exchanges. The Price and Liquidity module 2010 applies market making algorithms to manage liquidity. The Price and Liquidity module 2010 may manage the cost of transfer based on the balance of resources on both sides of Darkpool. It drives up the cost of sustained mismatch in the flow of capital. A sustained imbalance in resource flow between A and B will result in increase in price to move from A→B and decrease B→A. The bigger the mismatch the greater the revenue of the model. Users can "invest" in mismatch to bring liquidity where needed.

Liquidity Darkpools can also be used to facilitate transfers between or within ecosystems when currency exchanges are involved. The chained flow can be repeated across many providers including available currency exchanges to provide a path for any flow of value and use external liquidity. Currency exchange can occur via Price and Liquidity module 2010. Process can be repeated and use counterparty exchange accounts to maximize liquidity.

Additional alternative structural and functional designs may be implemented for conducting cross ledger transfers. Thus, while implementations and examples have been illustrated and described, it is to be understood that the invention is not limited to the precise construction and components disclosed herein. Various modifications, changes and variations may be made in the arrangement, operation and details of the method and apparatus disclosed herein without departing from the spirit and scope of the invention defined in the appended claims.

What is claimed is:

1. A method for creating an interface between heterogenous computing networks to accomplish a cross-network transaction in a system consisting of multiple networks having different communication protocols, the method comprising:
    receiving information specifying a transaction that spans at least two networks and has a source node in a first network having a first communication protocol and a destination node in a second network having a second communication protocol, the first communication protocol being different from the second communication protocol;
    traversing nodes of a graph structure by applying a node traversing algorithm to the graph structure, the graph structure including a data structure representing at least one transaction node having an address within the first network and a data structure representing at least one transaction node having an address within the second network, the graph structure also including at least one bridge data structure specifying metadata indicating a pair of bridge nodes, each bridge node having an address in a different network and each bridge node having an associated set of attribute variables, the attribute variables specifying tokens supported by each bridge node and account addresses for each bridge node, the bridge data structure also specifying attribute values representing digital transmission characteristics for communication between the networks of the bridge nodes the graph structure being created by a multi-agent system that crawls the networks;
    generating transaction routing information specifying a set of sub-transactions for executing the transaction from the source node to the destination node based on the graph structure by identifying at least one network path between the source node and the destination node using network nodes and at least one of the at least one bridges, the transaction routing information including the anticipated cost and time of the transaction if the route is used; and
    controlling execution of the set of sub-transactions using a manager that executes and controls the sequencing of execution of the sub-transactions across heterogeneous networks, ensures and records successful execution of the full chain, and executes rollback if the transaction fails.

2. The method of claim 1, wherein the generating includes determining transfer paths based on the transaction routing information, the transfer paths including the set of sub-transactions, the determining including inspecting a catalog of transfer messaging terms and a translation schema which maps heterogeneous ontologies of Distributed Ledger Technology (DLT) networks into an optimized transfer path by applying a syntax-independent model and modeling the sub-transactions according to the syntax-independent model and applying interfaces between the DLT networks in the optimized transfer path.

3. The method of claim 1, wherein the bridge data structure specifies, at least one source network wallet, at least one destination network wallet, and transaction pricing models for value flowing between nodes in the pair of nodes.

4. The method of claim 1, wherein the bridge data structure specifies transformation logic to be attached to the interfaces.

5. The method of claim 1, wherein the generating comprises parsing the attribute variables to identify acceptable routes.

6. The method of claim 1, wherein each node is wrapped with a common transaction interface that translates syntax independent instructions to the specific network syntax to enable transaction execution on dissimilar networks.

7. The method of claim 1, further comprising publishing the transaction and a linkage to each sub-transaction to an independent ledger.

8. The method of claim 7, wherein the published transaction uses a Zero Knowledge Proof to provide immutability while maintaining transaction privacy.

9. A computer system for creating an interface between heterogenous computing networks to accomplish a cross-network transaction in a system consisting of multiple networks having different communication protocols, the system comprising:
    at least one computer processor; and
    at least one memory storing computer readable instructions which, when executed by the at least one computer processor, cause the at least one computer processor to:
        receive information specifying a transaction that spans at least two networks and has a source node in a first network having a first communication protocol and a destination node in a second network having a second communication protocol, the first communication protocol being different from the second communication protocol;

traverse nodes of a graph structure by applying a node traversing algorithm to the graph structure, the graph structure including a data structure representing at least one transaction node having an address within the first network and a data structure representing at least one transaction node having an address within the second network, the graph structure also including at least one bridge data structure specifying metadata indicating a pair of bridge nodes, each bridge node having an address in a different network and each bridge node having an associated set of attribute variables, the attribute variables specifying supported tokens and account addresses for each bridge node, the bridge data structure also specifying attribute values representing digital transmission characteristics for communication between the networks of the bridge nodes the graph structure being created by a multi-agent system that crawls the networks;

generate transaction routing information specifying a set of sub-transactions for executing the transaction from the source node to the destination node based on the graph structure by identifying at least one network path between the source node and the destination node using network nodes and at least one of the at least one bridges, the transaction routing, the transaction routing information including the anticipated cost and time of the transaction if the route is used; and control execution of the set of sub-transactions using a manager that executes and controls the sequencing of execution of the sub-transactions across heterogeneous networks, ensures and records successful execution of the full chain, and executes rollback if the transaction fails.

10. The system of claim 9, wherein the generating includes determining transfer paths based on the transaction routing information, the transfer paths including the set of sub-transactions, the determining including inspecting a catalog of transfer messaging terms and a translation schema which maps heterogeneous ontologies of Distributed Ledger Technology (DLT) networks into an optimized transfer path by applying a syntax-independent model and modeling the sub-transactions according to the syntax-independent model and applying interfaces between the DLT networks in the optimized transfer paths.

11. The system of claim 9, wherein the bridge data structure specifies, at least one source network wallet, at least one destination network wallet, and transaction pricing models for value flowing between nodes in the pair of nodes.

12. The system of claim 9, wherein the bridge data structure specifies transformation logic to be attached to the interfaces.

13. The system of claim 9, wherein the generating comprises parsing the attribute variables to identify acceptable routes.

14. The system of claim 9, wherein each node is wrapped with a common transaction interface that translates syntax independent instructions to the specific network syntax to enable transaction execution on dissimilar networks.

15. The system of claim 9, wherein the instructions, when executed by the at least one processor, further cause the at least one processor comprising publish the transaction and the linkage to each sub-transaction to an independent ledger.

16. The system of claim 15, wherein the published transaction uses a Zero Knowledge Proof to provide immutability while maintaining transaction privacy.

* * * * *